(12) United States Patent
Hashimoto et al.

(10) Patent No.: US 11,134,260 B2
(45) Date of Patent: Sep. 28, 2021

(54) ENCODER, DECODER, ENCODING METHOD, AND DECODING METHOD

(71) Applicant: Panasonic Intellectual Property Corporation of America, Torrance, CA (US)

(72) Inventors: Takashi Hashimoto, Hyogo (JP); Kiyofumi Abe, Osaka (JP); Tadamasa Toma, Osaka (JP); Takahiro Nishi, Nara (JP); Ryuichi Kanoh, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/860,367

(22) Filed: Apr. 28, 2020

(65) Prior Publication Data
US 2020/0260100 A1    Aug. 13, 2020

Related U.S. Application Data

(63) Continuation of application No. PCT/JP2018/039421, filed on Oct. 24, 2018.

(60) Provisional application No. 62/578,756, filed on Oct. 30, 2017.

(51) Int. Cl.
*H04N 19/51* (2014.01)
*H04N 19/433* (2014.01)

(52) U.S. Cl.
CPC ........... *H04N 19/51* (2014.11); *H04N 19/433* (2014.11)

(58) Field of Classification Search
CPC ............................. H04N 19/51; H04N 19/433
USPC ....................................................... 375/240.16
See application file for complete search history.

(56) References Cited

U.S. PATENT DOCUMENTS

2019/0230350 A1*    7/2019  Chen .................... H04N 19/573

OTHER PUBLICATIONS

International Search Report and Written Opinion, dated Dec. 4, 2018, for corresponding International Application No. PCT/JP2018/039421, 10 pages.

(Continued)

*Primary Examiner* — Allen C Wong
(74) *Attorney, Agent, or Firm* — Seed IP Law Group LLP

(57) ABSTRACT

An encoder that encodes a picture to generate a coded stream includes: circuitry and a memory coupled to the circuitry. The circuitry performs, using the memory: generating a prediction image of a current block included in a current picture by referring to a first region included in a reference picture different from the current picture; operating a bi-directional optical flow process to correct the prediction image by referring to a second region included in the first region, and not operating the bi-directional optical flow process in response to the second region not being included in the first region; and encoding the current block based on the prediction image.

6 Claims, 32 Drawing Sheets

(56) References Cited

OTHER PUBLICATIONS

ISO/IEC 23008-2, "Information technology—High efficiency coding and media delivery in heterogeneous environments—Part 2: High efficiency video coding," International Standard, First Edition, Dec. 1, 2013, 312 pages.

Jang et al., "Unified search range for FRUC," JVET-H0058, Joint Video Experts Team (JVET) of ITU-T SG 16 WP 3 and ISO/IEC JTC 1/SC 29/WG 11, 8$^{th}$ Meeting: Macao, China, Oct. 18-24, 2017, 7 pages.

Jang et al., "Unified search range for FRUC," JVET-H0058, Joint Video Exploration Team (JVET) of ITU-T SG 16 WP 3 and ISO/IEC JTC 1/SC 29/WG 11, 8$^{th}$ Meeting: Macao, China, Oct. 18-24, 2017, 7 pages.

* cited by examiner

FIG. 3

| TRANSFORM TYPE | BASIS FUNCTION $T_i(j)$, $i, j = 0, 1, ..., N - 1$ |
|---|---|
| DCT-II | $T_i(j) = \omega_0 \cdot \sqrt{\dfrac{2}{N}} \cdot \cos\left(\dfrac{\pi \cdot i \cdot (2j + 1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N - 1}} \cdot \cos\left(\dfrac{2\pi \cdot i \cdot j}{2N - 1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N + 1}} \cdot \cos\left(\dfrac{\pi \cdot (2i + 1) \cdot (2j + 1)}{4N + 2}\right)$ |
| DST-I | $T_i(j) = \sqrt{\dfrac{2}{N + 1}} \cdot \sin\left(\dfrac{\pi \cdot (i + 1) \cdot (j + 1)}{N + 1}\right)$ |
| DST-VII | $T_i(j) = \sqrt{\dfrac{4}{2N + 1}} \cdot \sin\left(\dfrac{\pi \cdot (2i + 1) \cdot (j + 1)}{2N + 1}\right)$ |

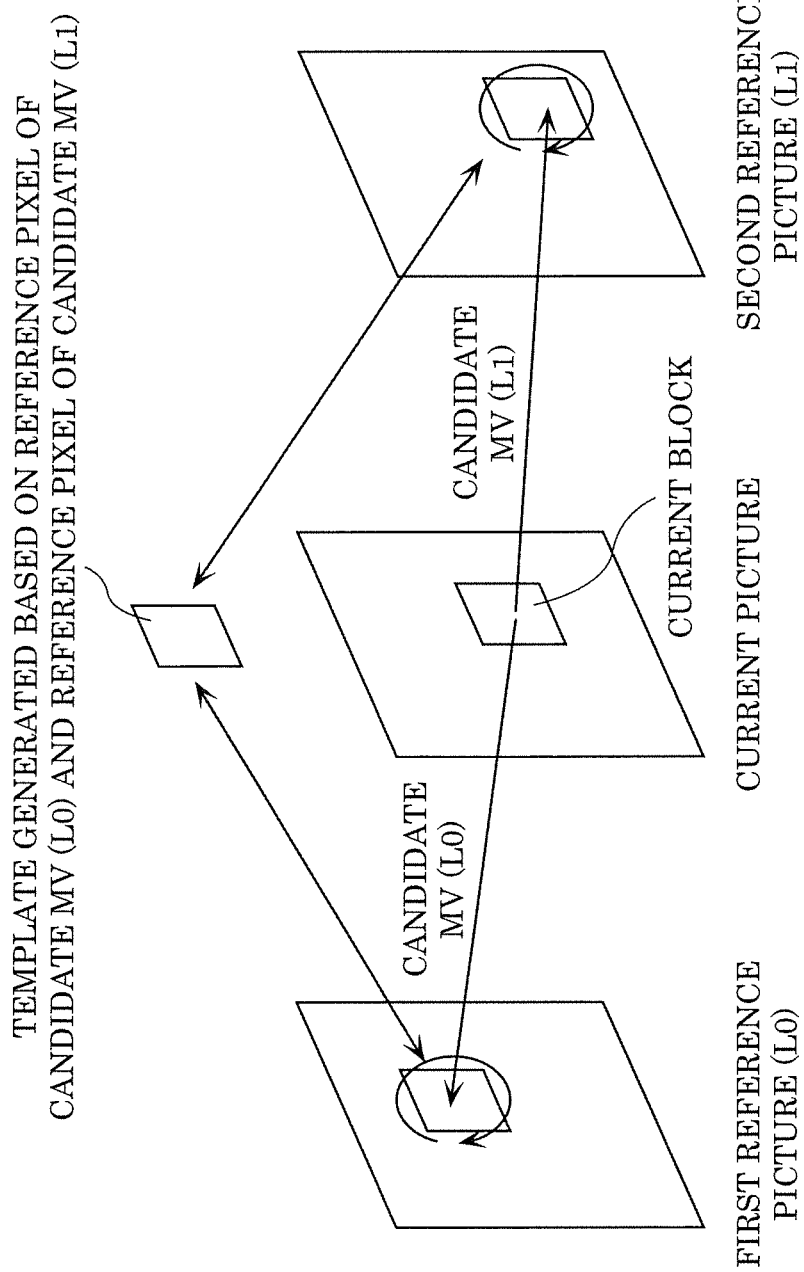

| CANDIDATE INDEX | REFERENCE PICTURE INDEX | MOTION VECTOR |
|---|---|---|
| 0 | 0 | (− 48, 0) |
| 1 | 0 | (− 32, 9) |
| 2 | 0 | (0, 12) |
| 3 | 0 | (− 20, 3) |

| REFERENCE PICTURE INDEX | OUTPUT ORDER |
|---|---|
| 0 | 4 |
| 1 | 3 |
| 2 | 2 |
| 3 | 1 |
| 4 | 0 |

ENCODER, DECODER, ENCODING METHOD, AND DECODING METHOD

CROSS REFERENCE TO RELATED APPLICATIONS

This application is a U.S. continuation application of PCT International Patent Application Number PCT/JP2018/039421 filed on Oct. 24, 2018, claiming the benefit of priority of U.S. Provisional Patent Application No. 62/578,756 filed on Oct. 30, 2017, the entire contents of which are hereby incorporated by reference.

BACKGROUND

1. Technical Field

The present disclosure relates to an encoder, a decoder, an encoding method, and a decoding method.

2. Description of the Related Art

The video coding standard called High-Efficiency Video Coding (HEVC) is standardized by the Joint Collaborative Team on Video Coding (JCT-VC).

SUMMARY

An encoder according to an aspect of the present disclosure is an encoder that encodes a picture to generate a coded stream includes: circuitry and a memory coupled to the circuitry. The circuitry performs, using the memory: generating a prediction image of a current block included in a current picture by referring to a first region included in a reference picture different from the current picture; operating a bi-directional optical flow process to correct the prediction image by referring to a second region included in the first region, and not operating the bi-directional optical flow process in response to the second region not being included in the first region; and encoding the current block based on the prediction image.

A decoder according to an aspect of the present disclosure is a decoder that decodes a coded stream to generate a picture includes: circuitry; and a memory coupled to the circuitry, wherein the circuitry performs, using the memory: generating a prediction image of a current block included in a current picture by referring to a first region included in a reference picture different from the current picture; operating a bi-directional optical flow process to correct the prediction image by referring to a second region included in the first region, and not operating the bi-directional optical flow process in response to the second region not being included in the first region; and decoding the current block based on the prediction image.

Note that these general and specific aspects may be implemented using a system, a method, an integrated circuit, a computer program, a computer-readable recording medium such as a CD-ROM, or any combination of systems, methods, integrated circuits, computer programs or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 9C is a conceptual diagram for illustrating an outline of DMVR processing;

DETAILED DESCRIPTION OF THE EMBODIMENTS

Figure 1:
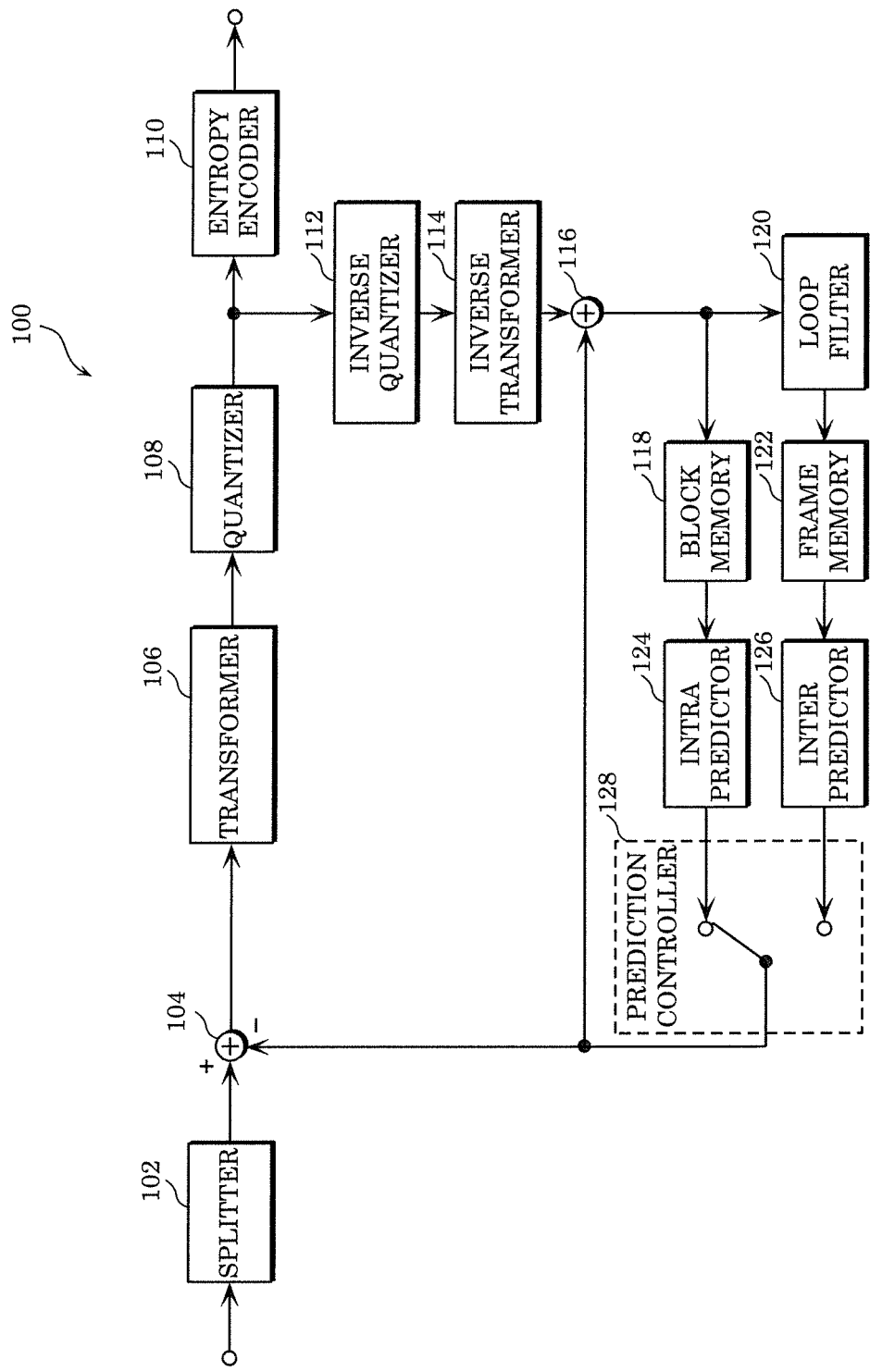
FIG. 1 is a block diagram illustrating a functional configuration of an encoder according to Embodiment 1.

Underlying Knowledge Forming Basis of the Present Disclosure

Furthermore, a mode in which a motion vector or a motion compensated image to be estimated in this manner is corrected is also being considered for a next-generation video compression standard. Even for such a mode, there is a demand for technology of inhibiting increases in processing load and memory bandwidth.

In view of this, an encoder according to an aspect of the present disclosure is an encoder that encodes a current block using a motion vector, and includes: circuitry; and a memory, wherein the circuitry, using the memory: estimates a motion vector of the current block without using an image of the current block by referring to a first region inside a reference picture, and performs motion compensation using the estimated motion vector; identifies a second region inside the reference picture, the second region being referred to in a correction process of correcting a prediction image of the current block obtained using the estimated motion vector or via the motion compensation; and permits the correction process when the second region is entirely included in the first region, and prohibits the correction process when the second region is not entirely included in the first region.

According to this, there is no need to refer to a new region following the correction process, and thus a new reference image need not be read from the frame memory, and the required amount of memory bandwidth for the correction process can be reduced.

An encoding method according to an aspect of the present disclosure is an encoding method of encoding a current block using a motion vector, and includes: estimating a motion vector of the current block without using an image of the current block by referring to a first region inside a reference picture, and performing motion compensation using the estimated motion vector; identifying a second region inside the reference picture, the second region being referred to in a correction process of correcting a prediction image of the current block obtained using the estimated motion vector or via the motion compensation; and permitting the correction process when the second region is entirely included in the first region, and prohibiting the correction process when the second region is not entirely included in the first region.

According to this, advantageous effects similar to those yielded by encoder described above can be produced.

A decoder according to an aspect of the present disclosure is a decoder that decodes a current block using a motion vector, and includes: circuitry; and a memory, wherein the circuitry, using the memory: estimates a motion vector of the current block without using an image of the current block by referring to a first region inside a reference picture, and performs motion compensation using the estimated motion vector; identifies a second region inside the reference picture, the second region being referred to in a correction process of correcting a prediction image of the current block obtained using the estimated motion vector or via the motion compensation; and permits the correction process when the second region is entirely included in the first region, and prohibits the correction process when the second region is not entirely included in the first region.

According to this, there is no need to refer to a new region following the correction process, and thus a new reference image need not be read from the frame memory, and the required amount of memory bandwidth for the correction process can be reduced.

A decoding method according to an aspect of the present disclosure is a decoding method of decoding a current block using a motion vector, and includes: estimating a motion vector of the current block without using an image of the current block by referring to a first region inside a reference picture, and performing motion compensation using the estimated motion vector; identifying a second region inside the reference picture, the second region being referred to in a correction process of correcting a prediction image of the current block obtained using the estimated motion vector or via the motion compensation; and permitting the correction process when the second region is entirely included in the first region, and prohibiting the correction process when the second region is not entirely included in the first region.

According to this, advantageous effects similar to those yielded by the decoder described above can be produced.

Note that these general and specific aspects may be implemented using a system, an integrated circuit, a computer program, a computer-readable recording medium such as a CD-ROM, or any combination of systems, integrated circuits, computer programs or recording media.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
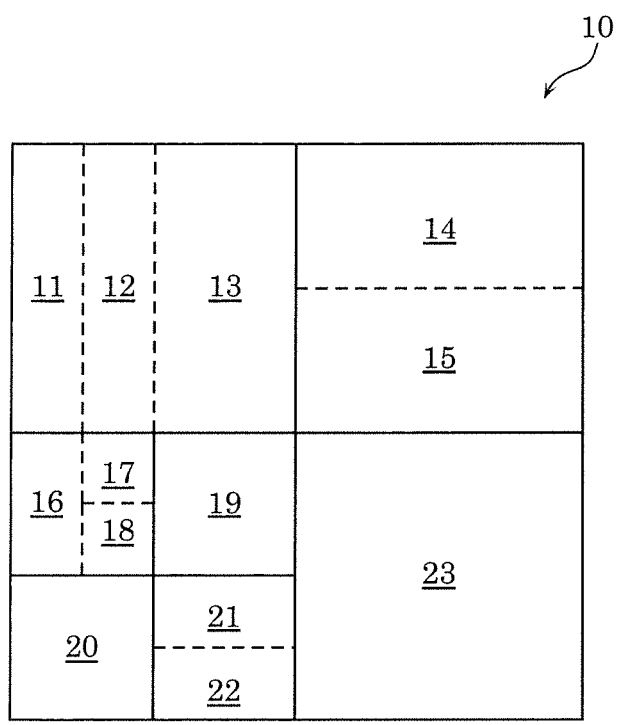
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
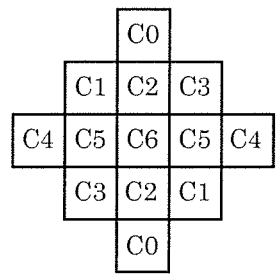
FIG. 4A illustrates one example of a filter shape used in ALF.
Figure 4B:
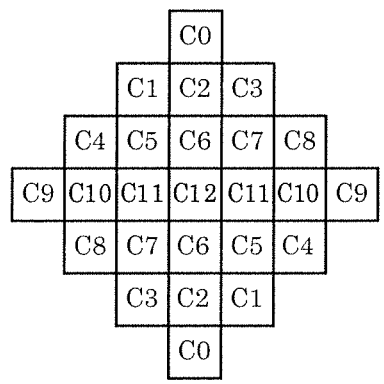
FIG. 4B illustrates another example of a filter shape used in ALF.
Figure 4C:
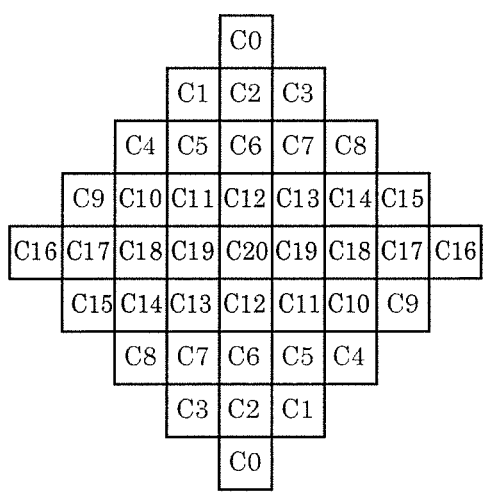
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see H.265 (ISO/IEC 23008-2 HEVC (High Efficiency Video Coding))).

Figure 5A:
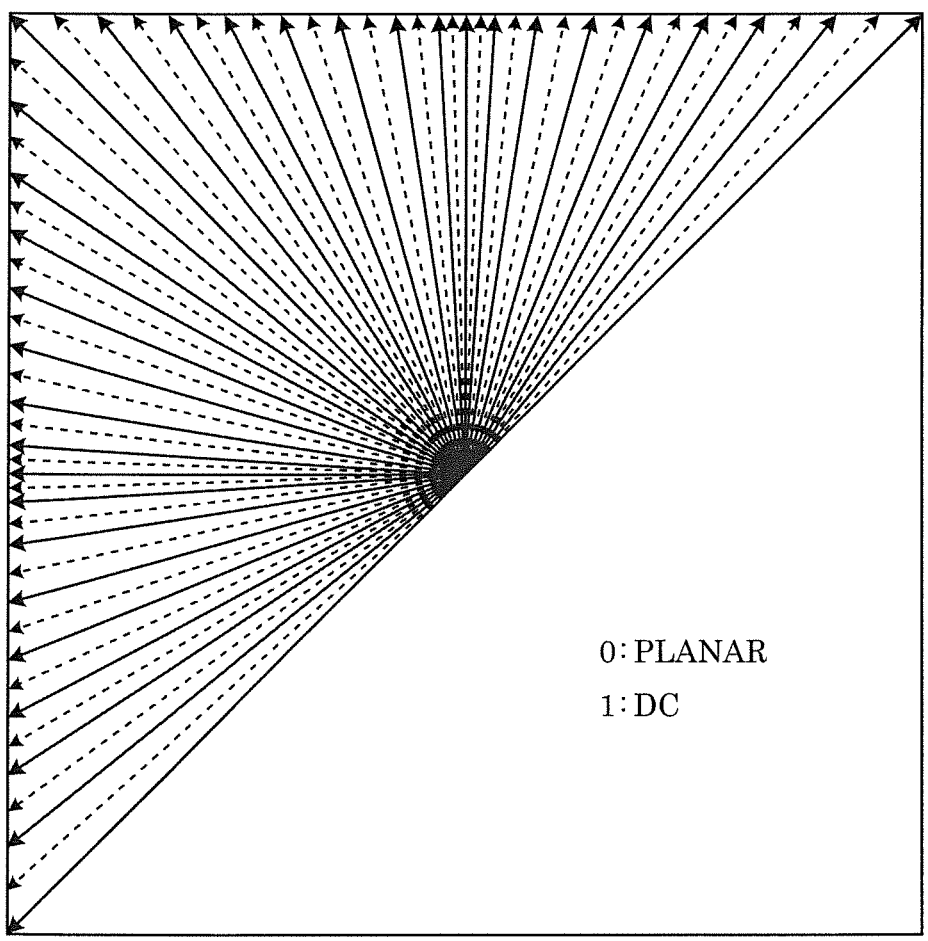
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
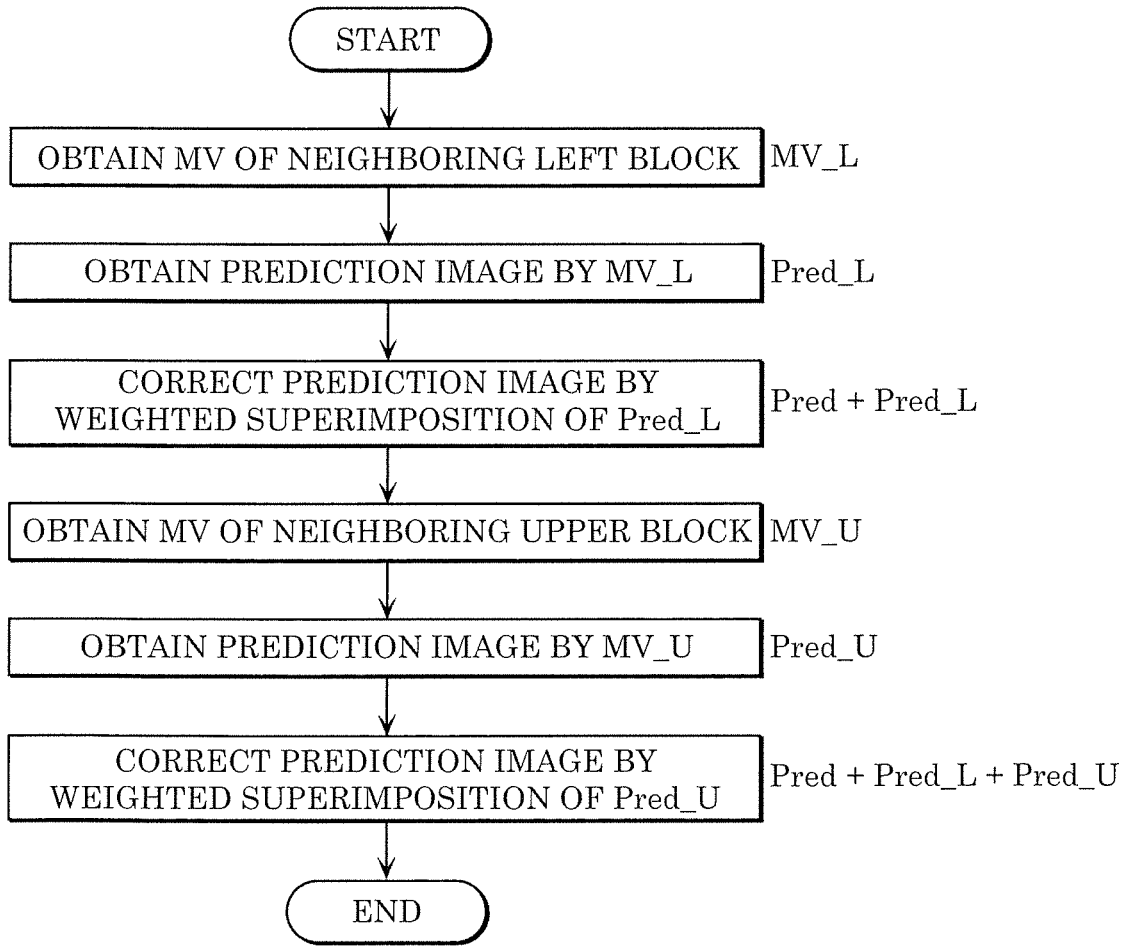
FIG. 5B is a flow chart for illustrating an outline of a prediction image correction process performed via OBMC processing.
Figure 5C:
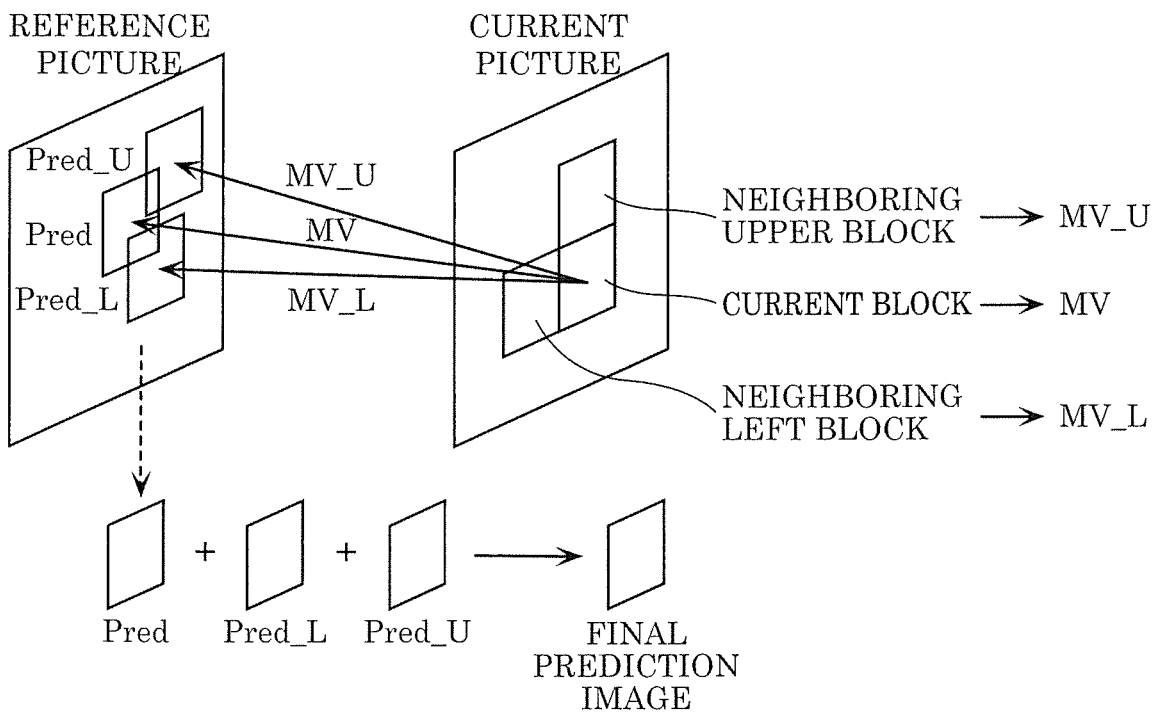
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
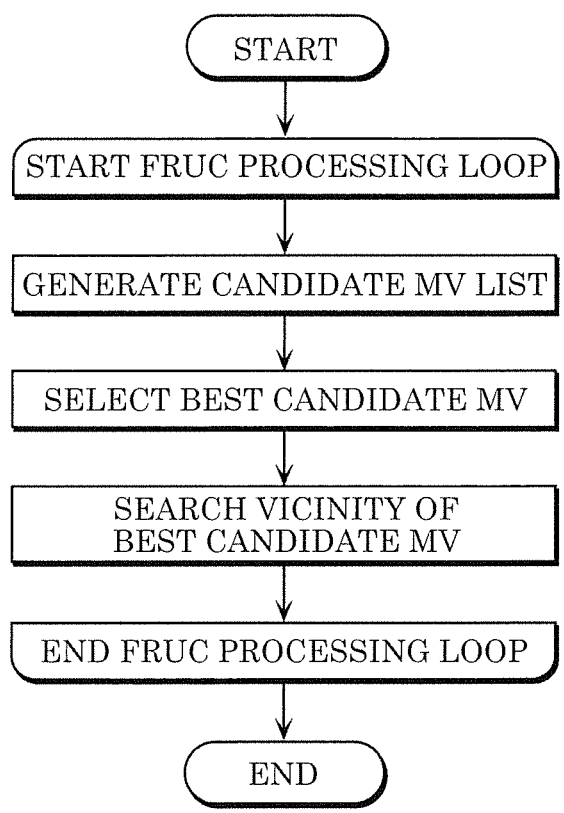
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
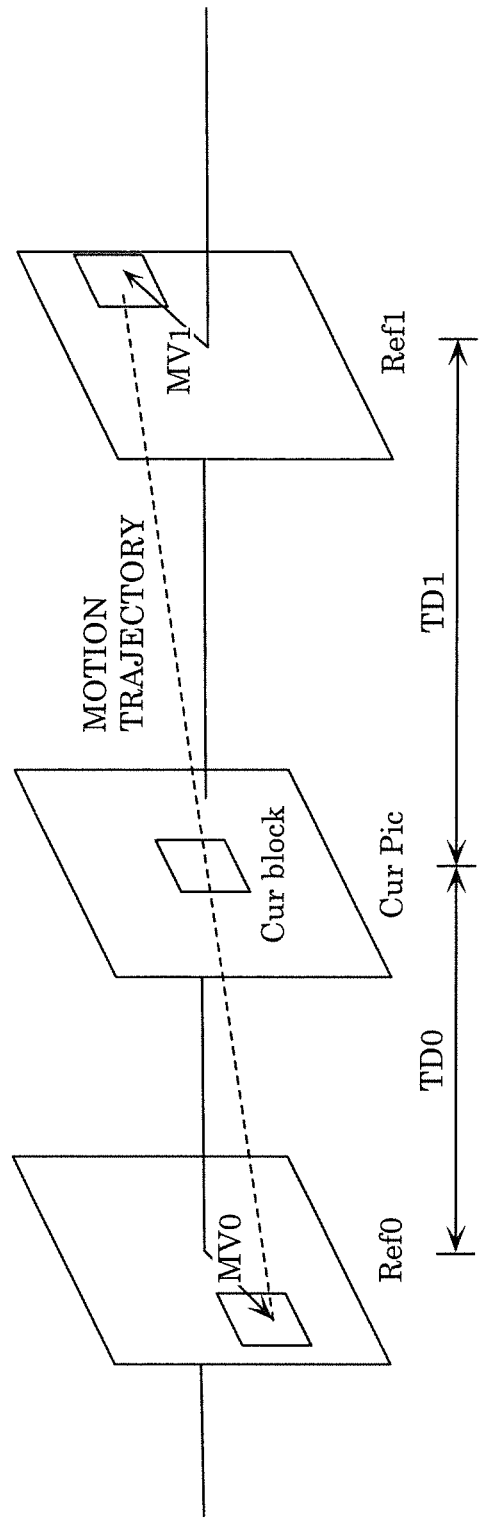
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
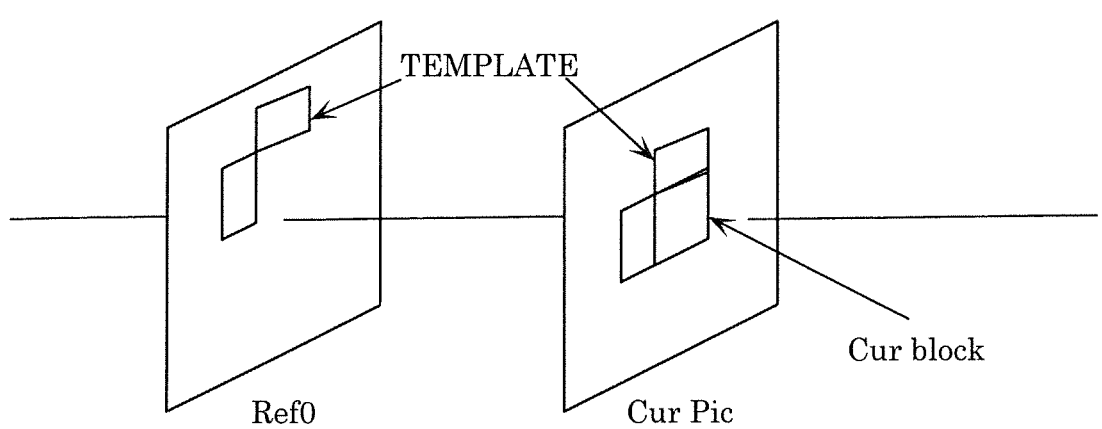
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
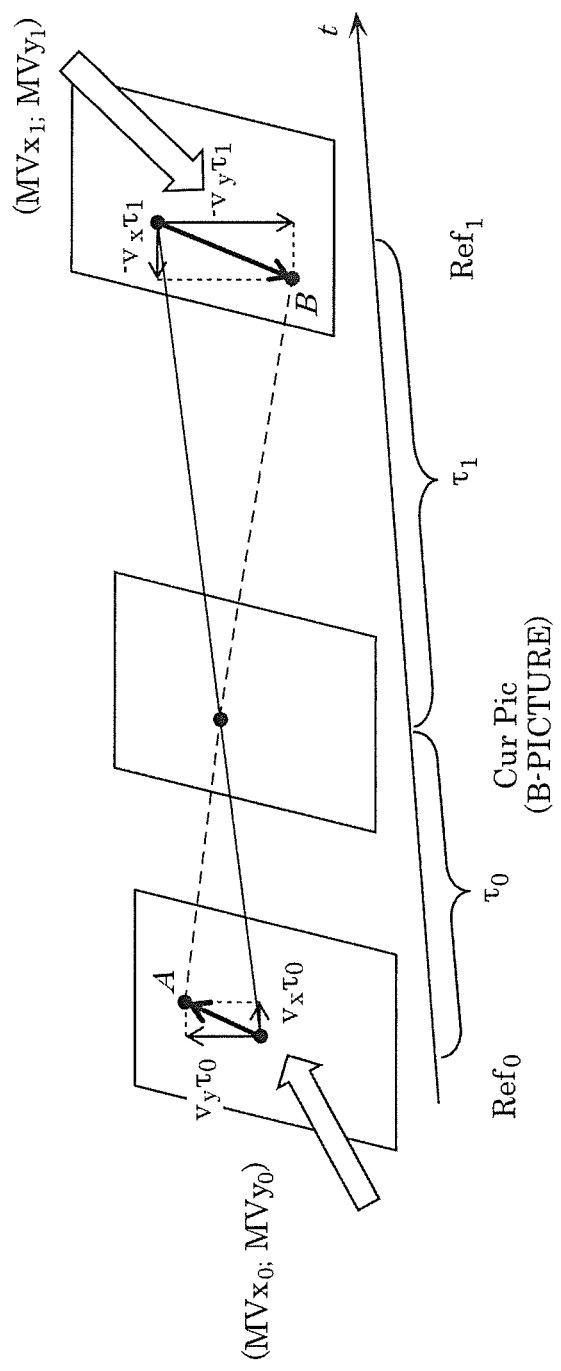
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \tag{1}$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
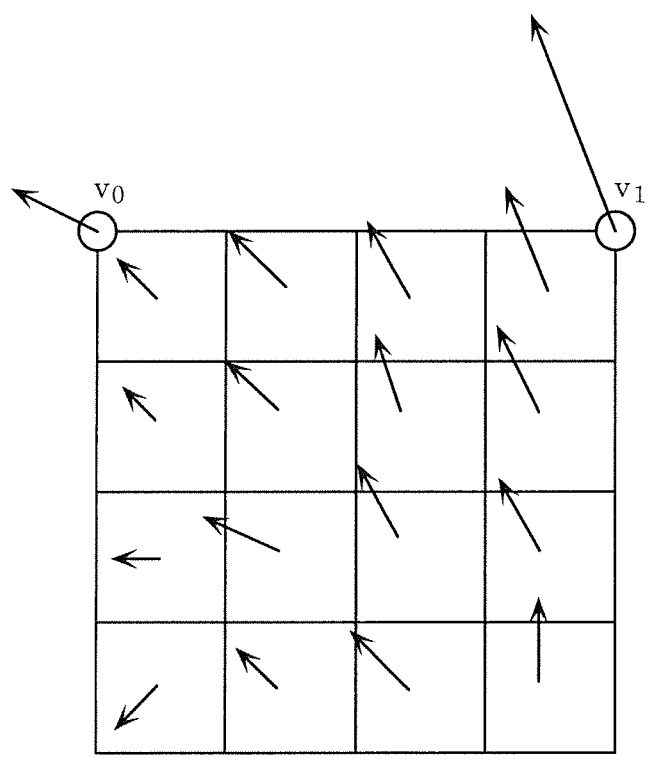
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
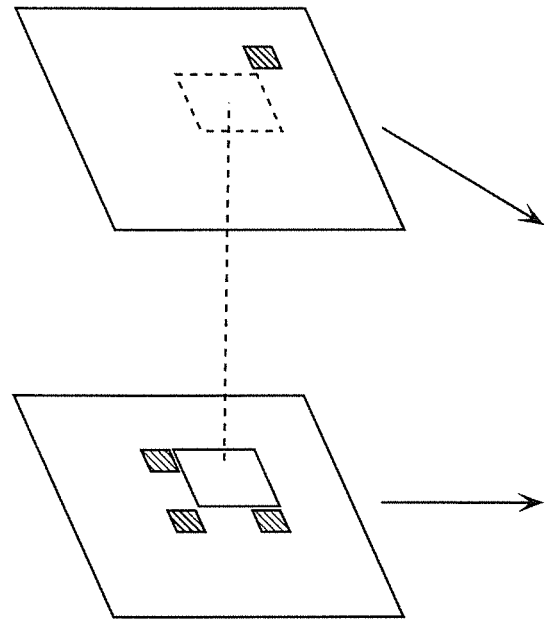
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
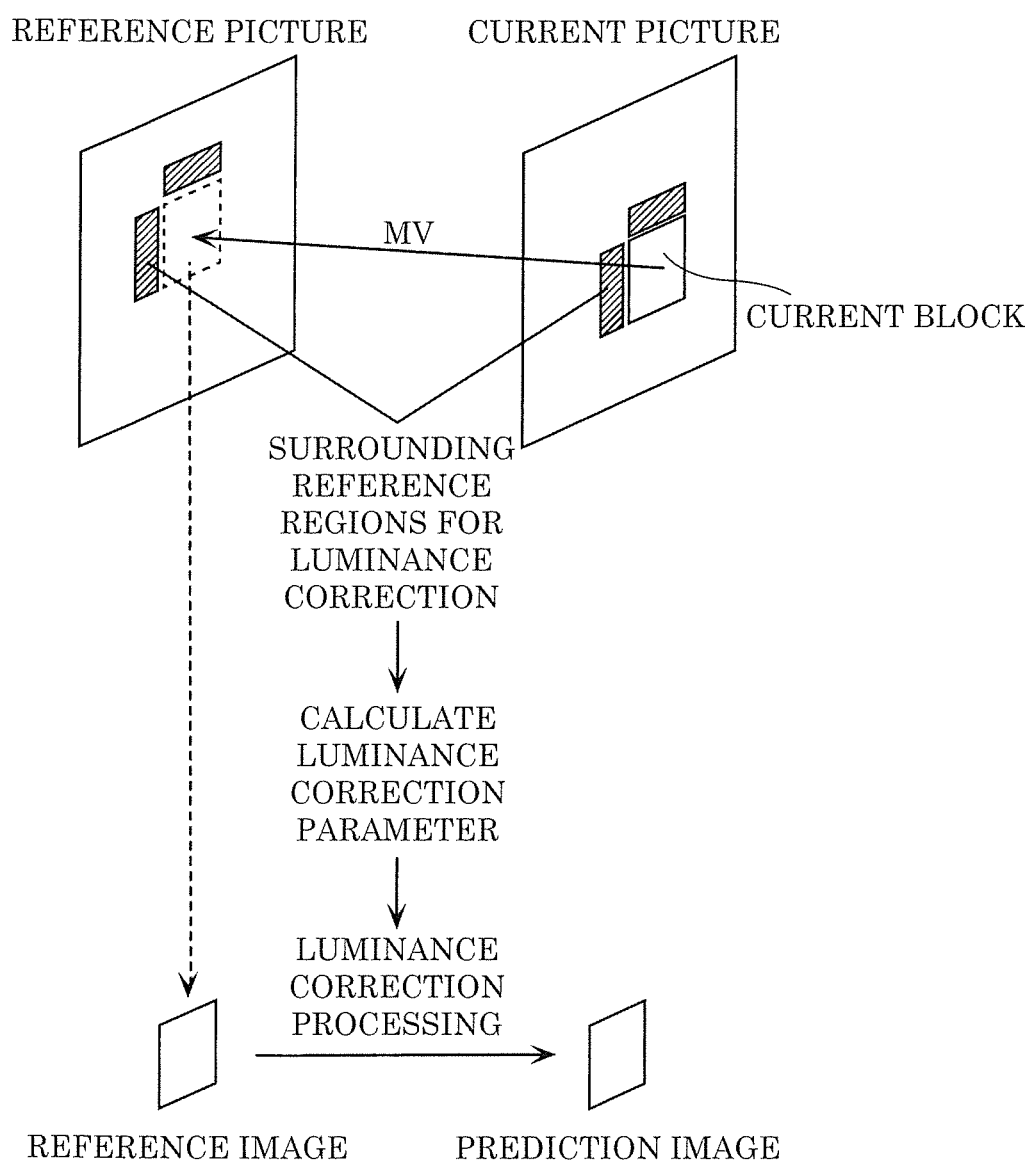
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing.

As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
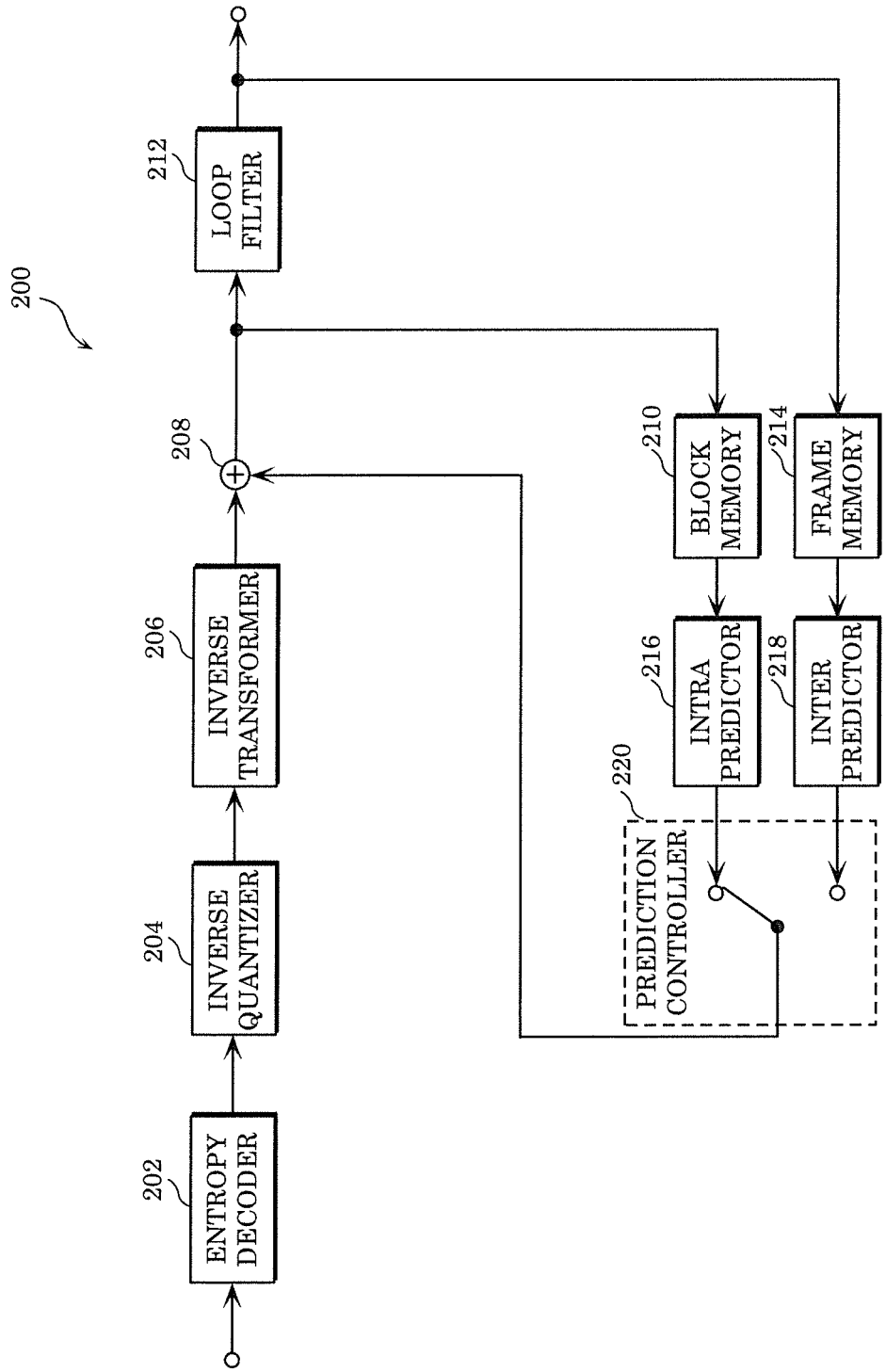
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Internal Configuration of Inter Predictor of Encoder]

Next, the internal configuration of inter predictor 126 of encoder 100 is to be described. Specifically, the functional configuration of inter predictor 126 of encoder 100 that allows the decoder to carry out a mode for motion estimation (the FRUC mode) is to be described.

Figure 11:
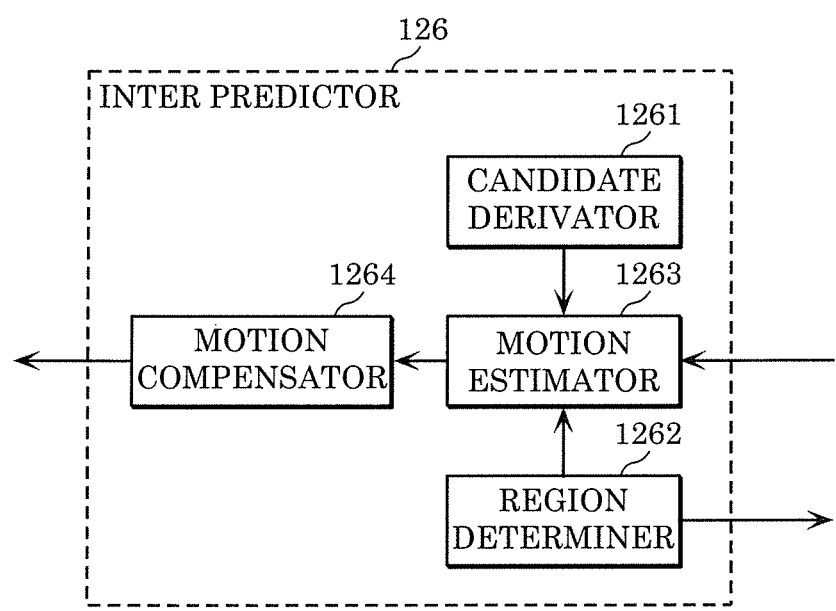
FIG. 11 is a block diagram illustrating an internal configuration of an inter predictor of the encoder according to Embodiment 1.

FIG. 11 is a block diagram illustrating the internal configuration of inter predictor 126 of encoder 100 according to Embodiment 1. Inter predictor 126 includes candidate derivator 1261, region determiner 1262, motion estimator 1263, and motion compensator 1264.

Candidate derivator 1261 derives a plurality of candidates each having at least one motion vector. The candidates may be referred to as motion vector predictor candidates. The motion vectors that the candidates have may be referred to as motion vector predictors.

Specifically, candidate derivator 1261 derives a plurality of candidates, based on motion vectors of encoded blocks that spatially or temporally neighbor a current block (hereinafter, referred to as neighboring blocks). A motion vector of a neighboring block is a motion vector used for compensating motion of the neighboring block.

For example, when two reference pictures are referred to during inter prediction for one neighboring block, candidate derivator 1261 derives one candidate having two reference picture indexes and two motion vectors, based on two motion vectors corresponding to the two reference pictures. For example, when one reference picture is referred to during inter prediction for one neighboring block, candidate derivator 1261 derives one candidate having one reference picture index and one motion vector, based on one motion vector corresponding to the one reference picture.

A plurality of candidates derived from a plurality of neighboring blocks are registered in the candidate list. At this time, a redundant candidate may be eliminated from the candidate list. A candidate having a motion vector (for example, a zero motion vector) with a fixed value may be registered if the candidate list is not filled with candidates. Note that the candidate list may be in common with the merge list used in the merge mode.

A spatially neighboring block means a block included in the current picture and neighboring the current block. A spatially neighboring block is, for example, a block on the left, the upper left, the top, or the upper right of the current block. A motion vector derived from a spatially neighboring block may be referred to as a spatial motion vector.

A temporally neighboring block means a block included in an encode/decoded picture different from the current picture. The position of a temporally neighboring block in an encoded/decoded picture corresponds to the position of the current block in the current picture. A temporally neighboring block may be referred to as a co-located block. A motion vector derived from a temporally neighboring block may be referred to as a temporal motion vector.

Region determiner 1262 determines a motion estimation region in a reference picture. The motion estimation region means a partial region in the reference picture, in which motion estimation is allowed.

The size of the motion estimation region is determined based on a memory bandwidth and a throughput, for example. The memory bandwidth and the throughput can be obtained from the levels defined according to the standard, for example. The memory bandwidth and the throughput may be obtained from a decoder. The size of the motion estimation region means the size of a partial region in a picture, and can be represented by, for example, the horizontal pixel count and the vertical pixel count that indicate the distances from the center of the motion estimation region to a vertical side and a horizontal side, respectively.

The position of the motion estimation region is determined based on a statistical representative vector of a plurality of motion vectors that a plurality of candidates in the candidate list have, for example. In the present embodiment, an average motion vector is used as a statistical representative vector. An average motion vector is made up of an average of horizontal values and an average of vertical values of a plurality of motion vectors.

Figure 12:
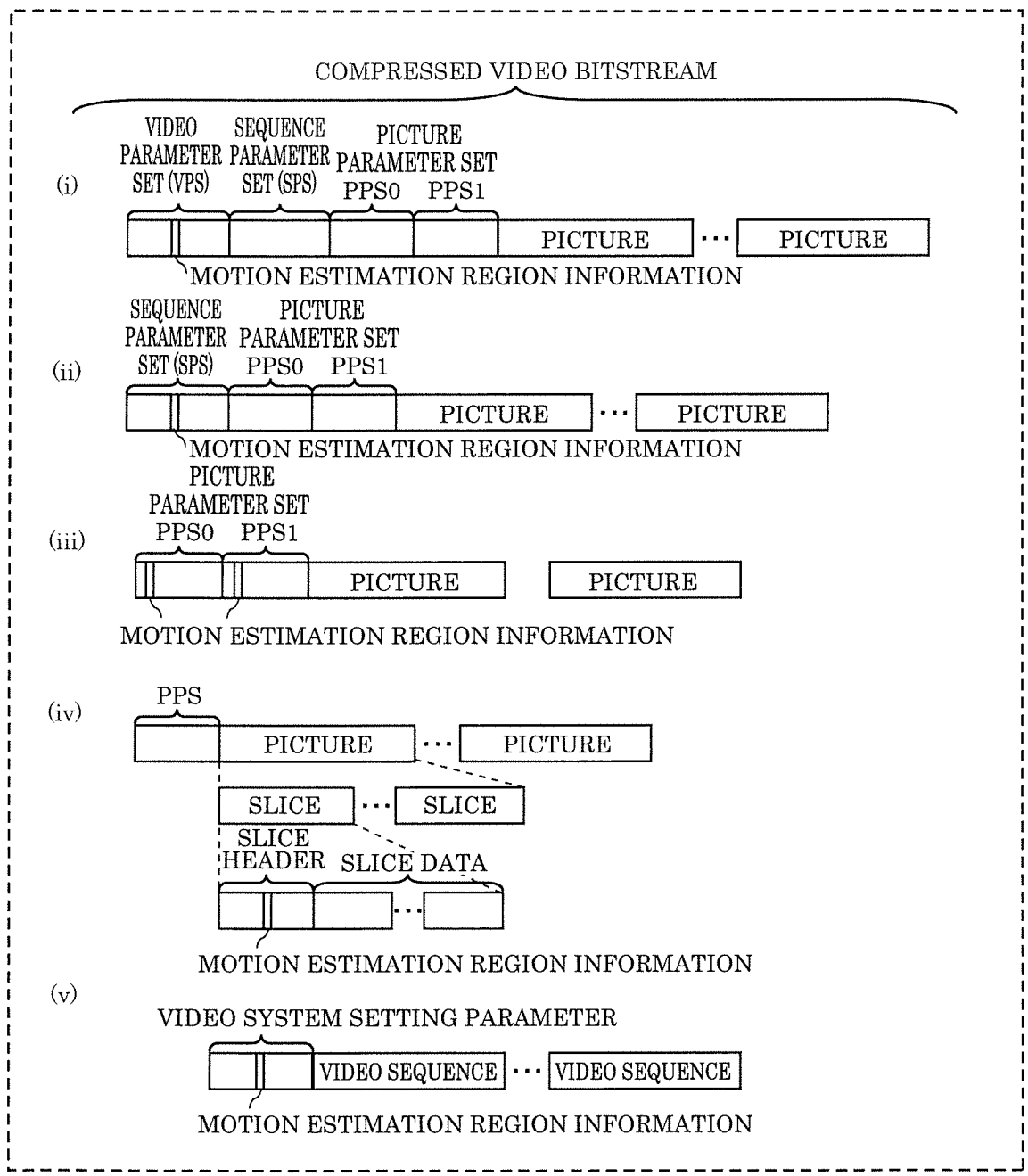
FIG. 12 illustrates examples of positions of motion estimation region information in bitstreams in Embodiment 1.

Information on the determined motion estimation region (hereinafter, referred to as motion estimation region information) is encoded in a bitstream. Motion estimation region information includes at least one of information indicating the size of the motion estimation region or information indicating the position of the motion estimation region, and includes only information indicating the size of the motion estimation region in the present embodiment. The position of motion estimation region information in a bitstream is not limited in particular. For example, motion estimation region information may be written in, as illustrated in FIG. 12, (i) a video parameter set (VPS), (ii) a sequence parameter set (SPS), (iii) a picture parameter set (PPS), (iv) a slice header, or (v) a video system setting parameter. Note that motion estimation region information may be or may not be subjected to entropy encoding.

Motion estimator 1263 performs motion estimation within the motion estimation region in a reference picture. Specifically, motion estimator 1263 performs motion estimation in only the motion estimation region in the reference picture. Specifically, motion estimator 1263 performs motion estimation as follows.

First, motion estimator 1263 reads a reconstructed image of the motion estimation region in the reference picture from frame memory 122. For example, motion estimator 1263 reads only a reconstructed image of the motion estimation region within the reference picture. Then, motion estimator 1263 excludes a candidate having a motion vector corresponding to the position outside the motion estimation region in the reference picture, from a plurality of candidates derived by candidate derivator 1261. Stated differently, motion estimator 1263 eliminates a candidate having a motion vector pointing to a position outside the motion estimation region from the candidate list.

Next, motion estimator 1263 selects a candidate from among the one or more remaining candidates. Thus, motion estimator 1263 selects a candidate from the candidate list from which a candidate having a motion vector corresponding to the position outside the motion estimation region has been eliminated.

Such candidate selection is based on evaluation values of the candidates. For example, when first pattern matching (bilateral matching) described above is applied, the evaluation value of each candidate is calculated based on a difference value between a reconstructed image of a region in the reference picture corresponding to a motion vector of the candidate and a reconstructed image of a region in another reference picture on the motion trajectory of the current block. Furthermore, for example, when second pattern matching (template matching) is applied, the evaluation value of each candidate is calculated based on a difference value between a reconstructed image of a region in a reference picture corresponding to a motion vector of the candidate and a reconstructed image of an encoded block neighboring the current block in a current picture.

Finally, motion estimator 1263 determines a motion vector for the current block, based on the selected candidate. Specifically, motion estimator 1263 performs, for example, pattern matching in an adjacent region included in the reference picture and corresponding to the motion vector that the selected candidate has, to search for a matching region for the current block in the adjacent region. Motion estimator 1263 determines a motion vector for the current block based on the matching region in the adjacent region. For example, motion estimator 1263 may determine the motion vector that the selected candidate has, as the motion vector for the current block.

Motion compensator 1264 performs motion compensation using the motion vector determined by motion estimator 1263, to generate an inter prediction signal for the current block.

[Operation of Inter Predictor of Encoder]

Next, operation of inter predictor 126 configured as above is to be described in detail with reference to FIGS. 13 to 17. The following describes the case where inter prediction is performed with reference to a single reference picture.

Figure 13:
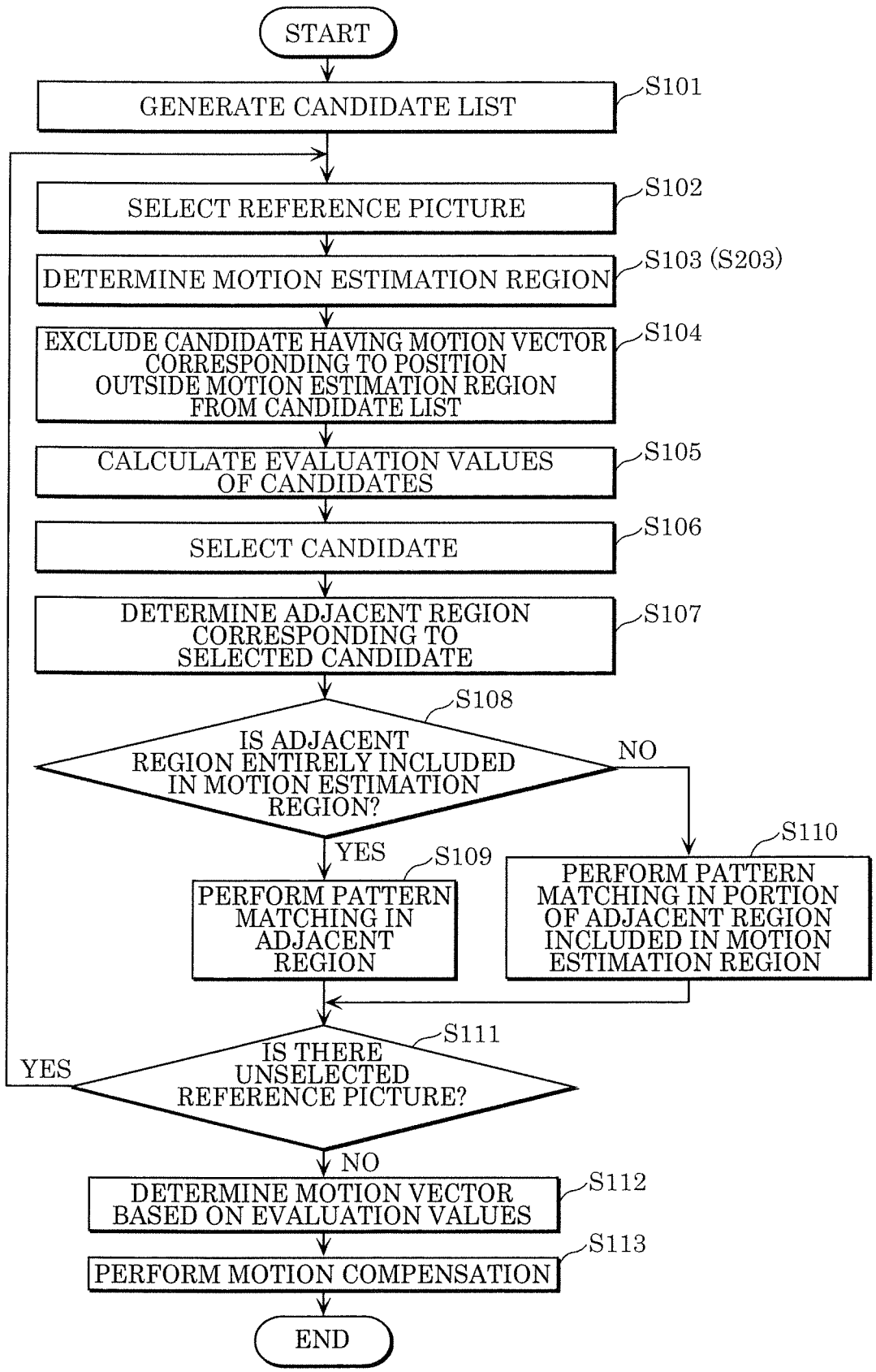
FIG. 13 is a flowchart illustrating processing performed by inter predictors of the encoder and the decoder according to Embodiment 1.

FIG. 13 is a flowchart illustrating processing performed by the inter predictors of the encoder and the decoder according to Embodiment 1. In FIG. 13, the numeral in the parentheses denotes processing performed by the inter predictor of the decoder.

Figures 14, 15, 16:
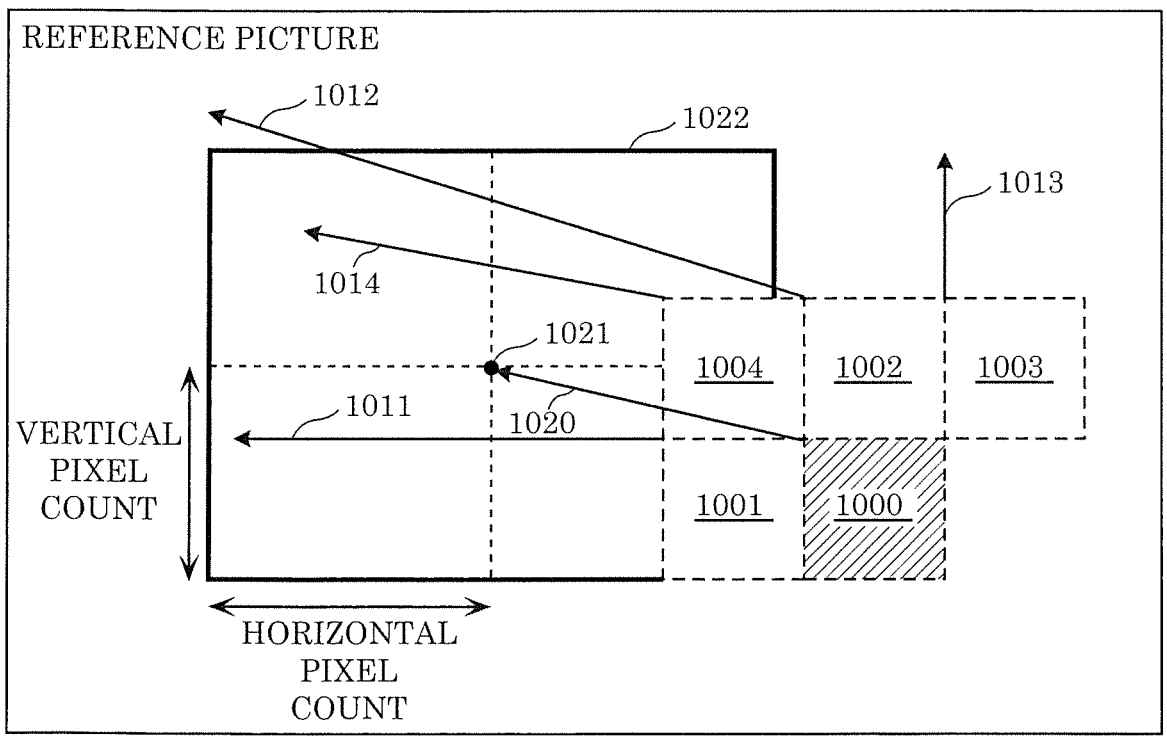
FIG. 14 illustrates an example of a candidate list in Embodiment 1.
FIG. 15 illustrates an example of a reference picture list in Embodiment 1.
FIG. 16 illustrates an example of a motion estimation region in Embodiment 1.

First, candidate derivator 1261 derives a plurality of candidates from neighboring blocks, and generates a candidate list (S101). FIG. 14 illustrates an example of the candidate list in Embodiment 1. Here, the candidates each have a candidate index, a reference picture index, and a motion vector.

Next, region determiner 1262 selects a reference picture from the reference picture list (S102). For example, region determiner 1262 selects a reference picture in ascending order of the reference picture indexes. For example, in the reference picture list in FIG. 15, region determiner 1262 first selects a reference picture having a reference picture index "0".

Region determiner 1262 determines a motion estimation region in the reference picture (S103). Here, the determination of the motion estimation region is to be described, with reference to FIG. 16.

FIG. 16 illustrates an example of motion estimation region 1022 in Embodiment 1. FIG. 16 illustrates current block 1000 and neighboring blocks 1001 to 1004 in a current picture, in the corresponding positions in a reference picture.

First, region determiner 1262 obtains motion vectors 1011 to 1014 of neighboring blocks 1001 to 1004 from the candidate list. Region determiner 1262 scales motion vectors 1011 to 1014 if necessary, and calculates average motion vector 1020 of motion vectors 1011 to 1014.

For example, region determiner 1262 calculates an average of the horizontal values of motion vectors "−25 (=((−48)+(−32)+0+(−20))/4)" and an average of the vertical values of motion vectors "6 (=(0+9+12+3)/4)", to calculate an average motion vector (−26, 6), with reference to the candidate list in FIG. 14.

Next, region determiner 1262 determines representative position 1021 of the motion estimation region, based on average motion vector 1020. The center position is adopted as representative position 1021, here. Note that representative position 1021 is not limited to the center position, and one of the vertex positions of the motion estimation region (for example, the upper left vertex position) may be used.

Further, region determiner 1262 determines the size of the motion estimation region, based on the memory bandwidth and the throughput, for instance. For example, region determiner 1262 determines the horizontal pixel count and the vertical pixel count that indicate the size of the motion estimation region.

Based on representative position 1021 and the size of the motion estimation region that are determined in this manner, region determiner 1262 determines motion estimation region 1022.

Here, the description returns to the flowchart in FIG. 13. Motion estimator 1263 excludes a candidate having a motion vector corresponding to the position outside the motion estimation region from the candidate list (S104). For example, in FIG. 16, motion estimator 1263 excludes candidates having motion vectors 1012 and 1013 pointing to the positions outside the motion estimation region from the candidate list.

Motion estimator 1263 calculates evaluation values of candidates remaining in the candidate list (S105). For example, motion estimator 1263 calculates, as an evaluation value, a difference value between a reconstructed image (template) of a neighboring block in the current picture and a reconstructed image of a region in the reference picture corresponding to a motion vector of a candidate (template matching). In this case, a region in the reference picture corresponding to a motion vector of a candidate is a region of a neighboring block that has been subjected to motion compensation using the motion vector of the candidate in the reference picture. The smaller the evaluation value calculated in this manner is, the higher the evaluation is. Note that an evaluation value may be a reciprocal of a difference value. In this case, the greater the evaluation value is, the higher the evaluation is.

Motion estimator 1263 selects a candidate from the candidate list, based on the evaluation values (S106). For example, motion estimator 1263 selects a candidate having the smallest evaluation value.

Figure 17:
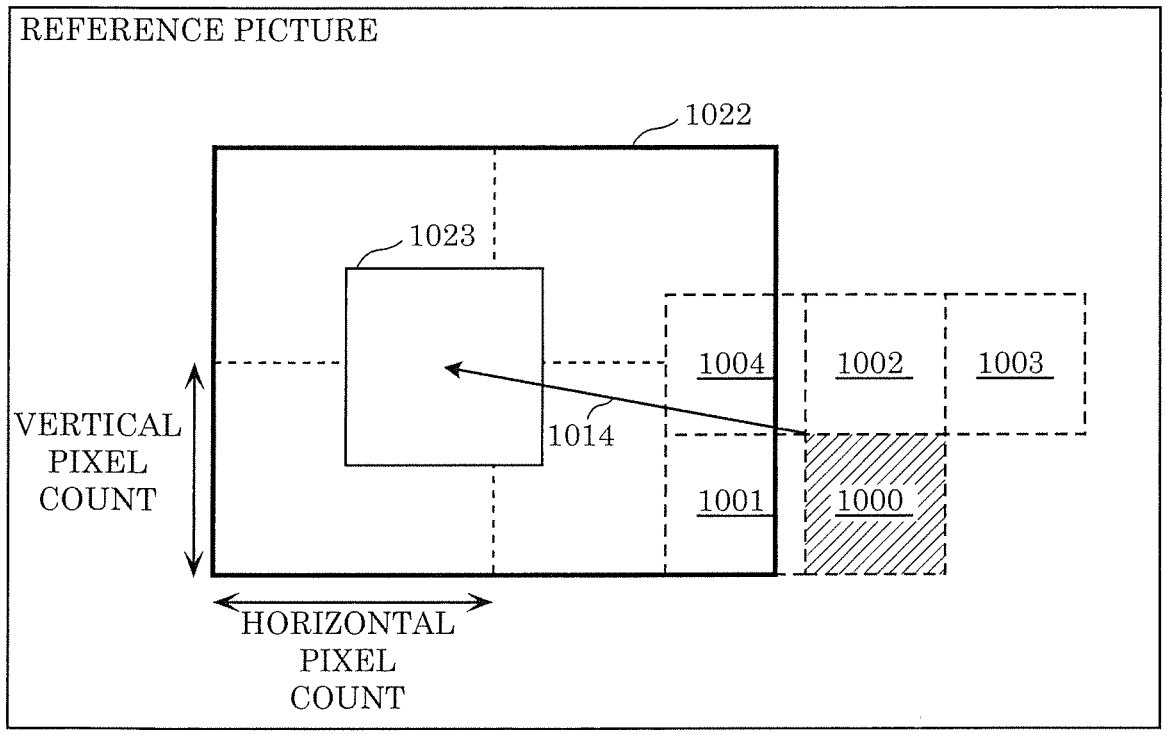
FIG. 17 illustrates an example of an adjacent region in Embodiment 1.

Motion estimator 1263 determines an adjacent region corresponding to the motion vector that the selected candidate has (S107). For example, when motion vector 1014 in FIG. 16 is selected, motion estimator 1263 determines, in the reference picture, adjacent region 1023 of the current block that has been subjected to motion compensation using motion vector 1014, as illustrated in FIG. 17.

The size of adjacent region 1023 may be defined by a standard in advance, for example. Specifically, for example, fixed sizes such as the 8×8, 16×16, or 32×32 pixel size may be defined as the size of adjacent region 1023, in advance. The size of adjacent region 1023 may be determined based on the throughput. In this case, information on the size of adjacent region 1023 may be written in a bitstream. The horizontal pixel count and the vertical pixel count that indicate the size of the motion estimation region may be determined and written in a bitstream, taking into consideration of the size of adjacent region 1023.

Motion estimator 1263 determines whether the determined adjacent region is entirely included in the motion estimation region (S108). Specifically, motion estimator 1263 determines whether the entire adjacent region is included in the motion estimation region.

Here, if the adjacent region is entirely included in the motion estimation region (Yes in S108), motion estimator 1263 performs pattern matching in the adjacent region (S109). As a result, motion estimator 1263 obtains an evaluation value of a region in the reference picture which matches a reconstructed image of a neighboring block in the adjacent region.

On the other hand, when the adjacent region is not entirely included in the motion estimation region (No in S108), motion estimator 1263 performs pattern matching in a partial region of the adjacent region included in the motion estimation region (S110). Specifically, motion estimator 1263 does not perform pattern matching in a partial region of the adjacent region not included in the motion estimation region.

Region determiner 1262 determines whether the reference picture includes an unselected reference picture (S111). Here, when there is an unselected reference picture (Yes in S111), the processing returns to the selection of a reference picture (S102).

On the other hand, when there is no unselected reference picture (No in S111), motion estimator 1263 determines a motion vector for the current picture, based on evaluation values (S112). Specifically, motion estimator 1263 determines a motion vector of the most highly evaluated candidate among a plurality of reference pictures, as the motion vector for the current picture.

[Internal Configuration of Inter Predictor of Decoder]

Next, the internal configuration of inter predictor 218 of decoder 200 is to be described. Specifically, the functional configuration of inter predictor 218 of decoder 200 that allows the decoder to carry out a mode for motion estimation (the FRUC mode) is to be described.

Figure 18:
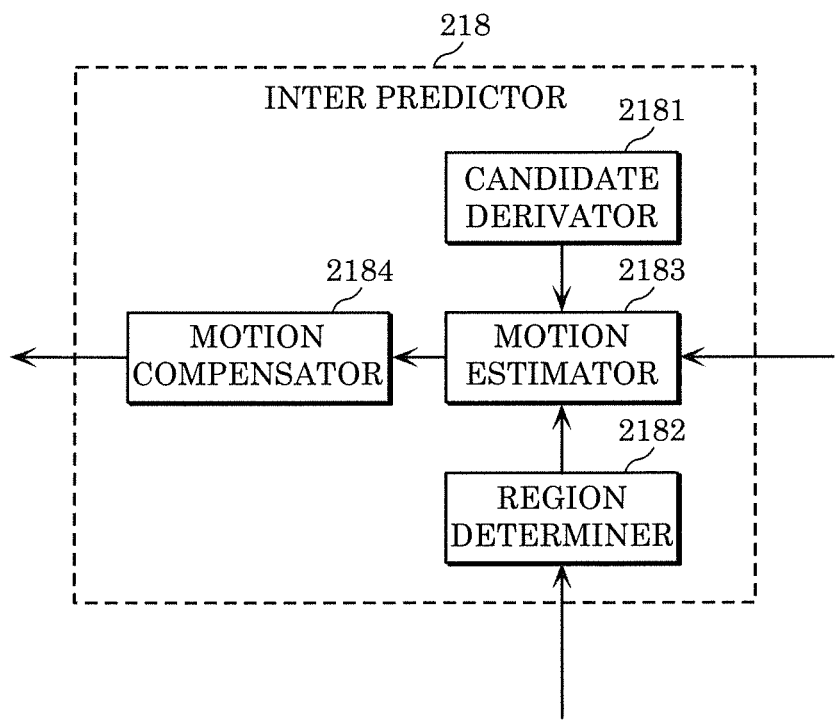
FIG. 18 is a block diagram illustrating an internal configuration of the inter predictor of the decoder according to Embodiment 1.

FIG. 18 is a block diagram illustrating the internal configuration of inter predictor 218 of decoder 200 according to Embodiment 1. Inter predictor 218 includes candidate derivator 2181, region determiner 2182, motion estimator 2183, and motion compensator 2184.

Candidate derivator 2181 derives a plurality of candidates each having at least one motion vector, similarly to candidate derivator 1261 of encoder 100. Specifically, candidate derivator 2181 derives a plurality of candidates, based on motion vectors of temporally and/or spatially neighboring blocks.

Region determiner 2182 determines the motion estimation region in a reference picture. Specifically, region determiner 2182 first obtains motion estimation region information parsed from a bitstream. Then, region determiner 2182 determines the size of the motion estimation region, based on the motion estimation region information. Furthermore, region determiner 2182 determines the position of the motion estimation region similarly to region determiner 1262 of encoder 100. Accordingly, the motion estimation region in the reference picture is determined.

Motion estimator 2183 performs motion estimation within the motion estimation region in the reference picture. Specifically, motion estimator 2183 first reads, from frame memory 214, a reconstructed image of the motion estimation region in the reference picture. For example, motion estimator 2183 reads only the reconstructed image of the motion estimation region within the reference picture. Motion estimator 2183 performs motion estimation within the motion estimation region, and determines a motion vector for the current block, similarly to motion estimator 1263 of encoder 100.

Motion compensator 2184 performs motion compensation using the motion vector determined by motion estimator 2183, to generate an inter prediction signal for the current block.

[Operation of Inter Predictor of Decoder]

Next, operation of inter predictor 218 having the configuration as described above is to be described with reference to FIG. 13. The processing by inter predictor 218 is the same as the processing by inter predictor 126 of encoder 100, except that step S103 is replaced with step S203. The following describes step S203.

Region determiner 2182 determines the motion estimation region in the reference picture (S203). At this time, region determiner 2182 determines the size of the motion estimation region, based on the motion estimation region information parsed from the bitstream. Furthermore, region determiner 2182 determines the position of the motion estimation region, based on a plurality of candidates included in a candidate list, similarly to region determiner 1262 of encoder 100.

Advantageous Effects and Others

As described above, inter predictor 126 of encoder 100 and inter predictor 218 of decoder 200 according to the present embodiment can exclude a candidate having a motion vector corresponding to the position outside the motion estimation region, and thereafter can select a candidate. Accordingly, the processing load for selecting a candidate can be reduced. Further, it is not necessary to read a reconstructed image of a region outside the motion estimation region from the frame memory, and thus the memory bandwidth for motion estimation can be reduced.

According to encoder 100 and decoder 200 according to the present embodiment, information on the motion estimation region can be written in a bitstream, and the bitstream can be parsed from the information on the motion estimation region. Accordingly, decoder 200 can also use the same motion estimation region as the motion estimation region used by encoder 100. Furthermore, the processing load on decoder 200 for determining the motion estimation region can be reduced.

According to encoder 100 and decoder 200 according to the present embodiment, information indicating the size of the motion estimation region can be included in a bitstream. Accordingly, decoder 200 can also use the motion estimation region having the same size as the size of the motion estimation region used by encoder 100. Further, the processing load on decoder 200 for determining the size of the motion estimation region can be reduced.

According to inter predictor 126 of encoder 100 and inter predictor 218 of decoder 200 according to the present embodiment can determine the position of the motion estimation region, based on an average motion vector obtained from a plurality of candidates derived from a plurality of blocks neighboring the current block. Accordingly, a region suitable for the search of a motion vector for the current block can be determined as the motion estimation region, and the accuracy of the motion vector can be improved.

According to inter predictor 126 of encoder 100 and inter predictor 218 of decoder 200 according to the present embodiment, a motion vector for the current block can be determined based on pattern matching in an adjacent region, in addition to a motion vector of a candidate. Accordingly, the accuracy of the motion vector can be further improved.

According to inter predictor 126 of encoder 100 and inter predictor 218 of decoder 200 according to the present embodiment, when an adjacent region is not included in the motion estimation region, pattern matching can be performed in a partial region of the adjacent region included in the motion estimation region. Accordingly, motion estimation in a region outside the motion estimation region can be avoided, and processing load and the required amount of the memory bandwidth can be reduced.

Variation 1 of Embodiment 1

In Embodiment 1 above, the position of the motion estimation region is determined based on an average motion vector of motion vectors that a plurality of candidates in the candidate list have, whereas in this variation, the position of the motion estimation region is determined based on a median motion vector of a plurality of motion vectors that a plurality of candidates in the candidate list have.

Region determiners 1262 and 2182 according to this variation obtain a plurality of motion vectors that a plurality of candidates have, with reference to the candidate list. Region determiners 1262 and 2182 calculate the median motion vector of the obtained motion vectors. The median motion vector is a motion vector constituted by a median of the horizontal values of the motion vectors and a median of the vertical values of the motion vectors.

Region determiners 1262 and 2182 calculate, with reference to, for example, the candidate list in FIG. 14, the median "−26 (=((−32)+(−20))/2)" of the horizontal values of the motion vectors and the median of vertical values "6 (=(9+3)/2)", to calculate median motion vector (−26, 6).

Next, region determiners 1262 and 2182 determine the representative position of a motion estimation region, based on the calculated median motion vector.

As described above, region determiners 1262 and 2182 according to this variation can determine the position of the motion estimation region, based on the median motion vector obtained from a plurality of candidates derived from a plurality of blocks neighboring the current block. Accordingly, a region suitable for the search of a motion vector for the current block can be determined as the motion estimation region, and the accuracy of the motion vector can be improved.

Variation 2 of Embodiment 1

Next, Variation 2 of Embodiment 1 is to be described. In this variation, the position of the motion estimation region is determined based on the smallest motion vector, instead of an average motion vector. The following describes this variation, focusing on a different point from Embodiment 1 above.

Region determiners 1262 and 2182 according to this variation obtain a plurality of motion vectors that a plurality of candidates have, with reference to the candidate list. Region determiners 1262 and 2182 select a motion vector (specifically, the smallest motion vector) that has the smallest magnitude, from among the obtained motion vectors.

Region determiners 1262 and 2182 select the motion vector (0, 8) that the candidate with the candidate index "2" has and has the smallest magnitude from among the plurality of motion vectors, with reference to the candidate list in FIG. 14, for example.

Next, region determiners 1262 and 2182 determine the representative position of the motion estimation region, based on the selected smallest motion vector.

Figure 19:
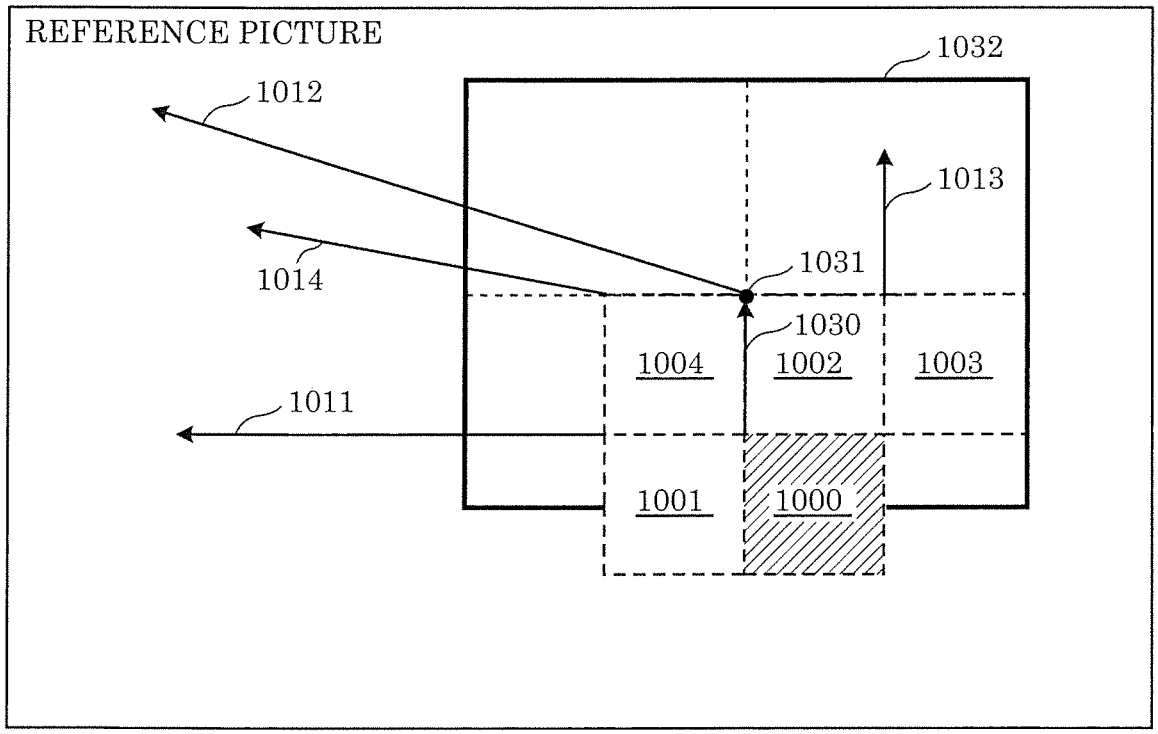
FIG. 19 illustrates an example of a motion estimation region in Variation 2 of Embodiment 1.

FIG. 19 illustrates an example of the motion estimation region in Variation 2 of Embodiment 1. In FIG. 19, region determiners 1262 and 2182 select motion vector 1013 that has the smallest magnitude among motion vectors 1011 to 1014 of neighboring blocks as smallest motion vector 1030. Next, region determiners 1262 and 2182 determine representative position 1031 of the motion estimation region, based on smallest motion vector 1030. Then, region determiners 1262 and 2182 determine motion estimation region 1032, based on determined representative position 1031.

As described above, region determiners 1262 and 2182 according to this variation can determine the position of the motion estimation region, based on the smallest motion vector obtained from candidates derived from blocks neighboring the current block. Accordingly, the region close to a current block can be determined as the motion estimation region, and the accuracy of a motion vector can be improved.

Variation 3 of Embodiment 1

Next, Variation 3 of Embodiment 1 is to be described. In this variation, the position of a motion estimation region is determined based on a motion vector of an encoded/decoded picture different from the current picture, instead of an average motion vector. The following is to describe this variation, focusing on a different point from Embodiment 1 above.

Region determiners 1262 and 2182 according to this variation select a reference picture that is an encoded/decoded picture different from the current picture, with reference to the reference picture list. For example, region determiners 1262 and 2182 select a reference picture having a reference picture index of the smallest value. For example, region determiners 1262 and 2182 may select a reference picture closest to the current picture in the output order.

Next, region determiners 1262 and 2182 obtain a plurality of motion vectors that have been used to encode/decode a plurality of blocks included in the selected reference picture. Region determiners 1262 and 2182 calculate an average motion vector of the obtained motion vectors.

Then, region determiners 1262 and 2182 determine the representative position of the motion estimation region, based on the calculated average motion vector.

As described above, according to region determiners 1262 and 2182 according to this variation, even when the current block in a current picture is changed, the motion vector of an encoded/decoded picture does not change, and thus it is unnecessary to determine a motion estimation region from the motion vectors of neighboring blocks each time the current block is changed. Specifically, the processing load for determining a motion estimation region can be reduced.

Note that here, although the representative position of the motion estimation region is determined based on the average motion vector of the selected reference picture, the present disclosure is not limited to this. For example, a median motion vector may be used instead of an average motion vector. For example, the motion vector of a co-located block may be used instead of an average motion vector.

Variation 4 of Embodiment 1

Next, Variation 4 of Embodiment 1 is to be described. In this variation, a reference picture is split into a plurality of regions, and motion vectors that candidates have are groped based on the split regions. At this time, the position of the motion estimation region is determined based on a group that includes the greatest number of motion vectors.

Figure 20:
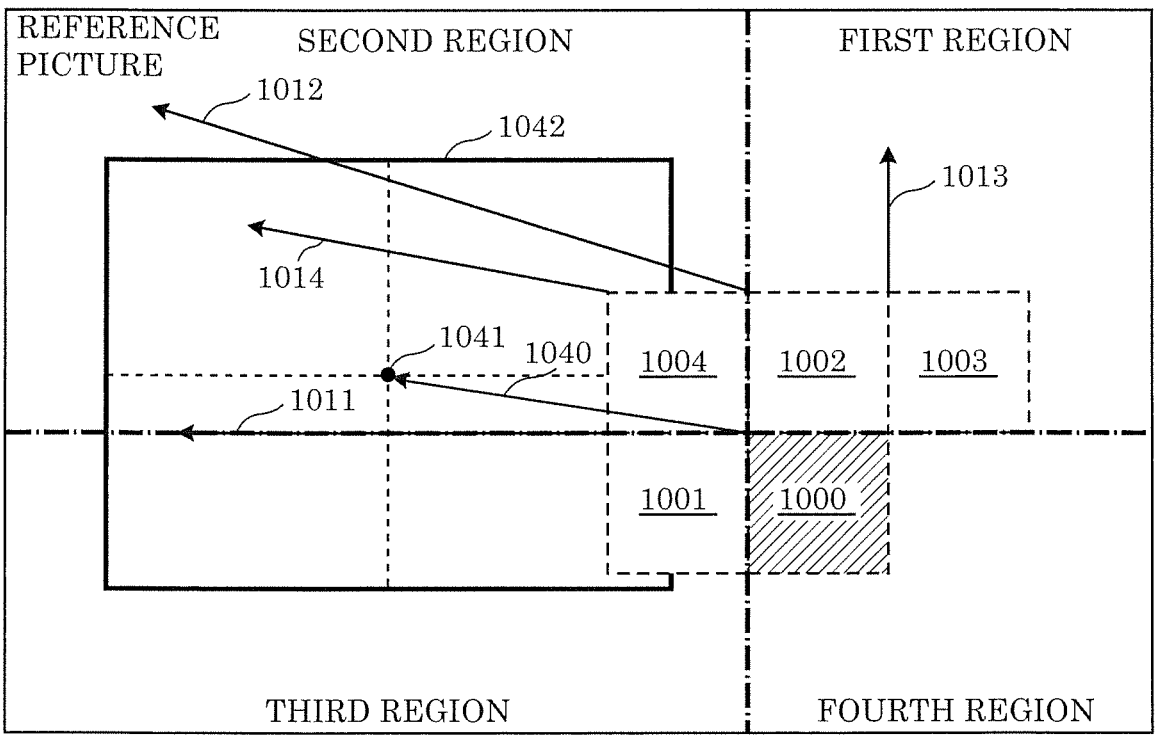
FIG. 20 illustrates an example of a motion estimation region in Variation 4 of Embodiment 1.

The following describes this variation, focusing on a different point from Embodiment 1 above, with reference to FIG. 20. FIG. 20 illustrates an example of the motion estimation region in Variation 4 of Embodiment 1.

Region determiners 1262 and 2182 according to this variation split a reference picture into regions. For example, as illustrated in FIG. 20, region determiners 1262 and 2182 split a reference picture into four regions (first to fourth regions), based on the position of a current picture.

Region determiners 1262 and 2182 group motion vectors of neighboring blocks, based on the regions. For example, in FIG. 20, region determiners 1262 and 2182 group motion vectors 1011 to 1014 into a first group that includes motion vector 1013 corresponding to the first region, and a second group that includes motion vectors 1011, 1012, and 1014 corresponding to the second region.

Region determiners 1262 and 2182 determine the position of a motion estimation region, based on a group that includes the greatest number of motion vectors. For example, in FIG. 20, region determiners 1262 and 2182 determine representative position 1041 of the motion estimation region, based on average motion vector 1040 of motion vectors 1011, 1012, and 1014 included in the second group. Note that a median motion vector or the smallest motion vector may be used instead of an average motion vector.

As described above, region determiners 1262 and 2182 according to this variation can determine a region suitable for the search of a motion vector for a current block as the motion estimation region, and thus the accuracy of the motion vector can be improved.

Variation 5 of Embodiment 1

Figure 21:
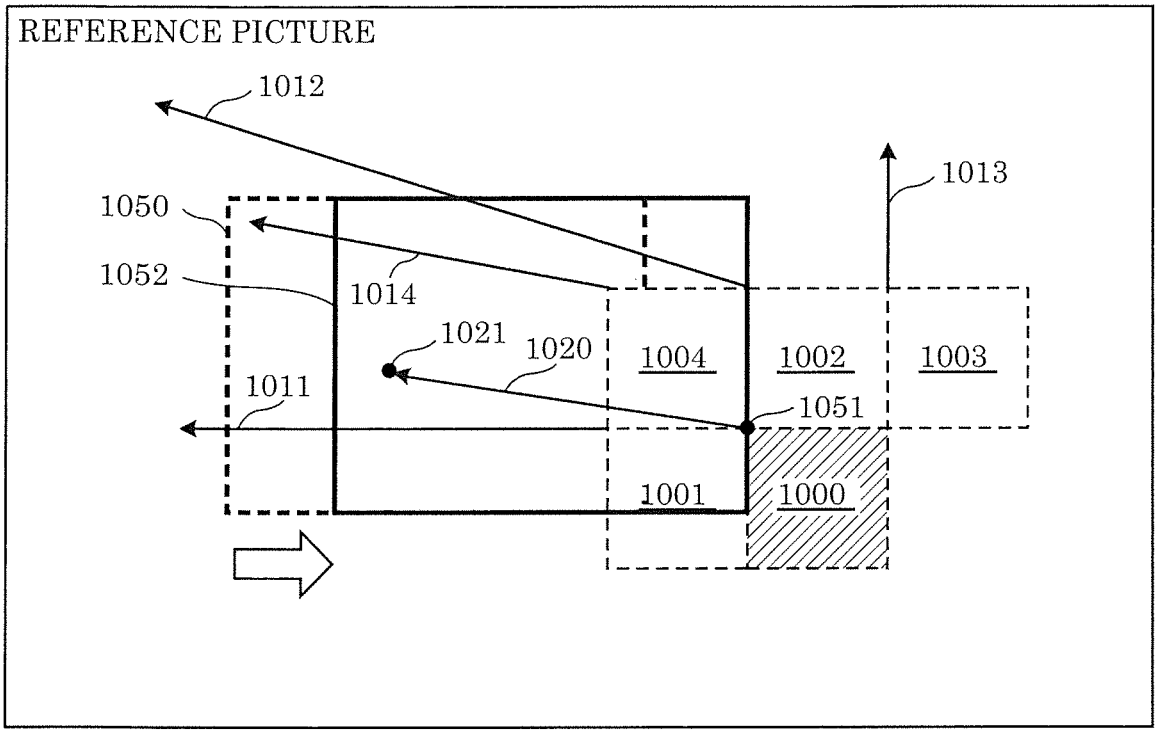
FIG. 21 illustrates an example of a motion estimation region in Variation 5 of Embodiment 1.

Next, Variation 5 of Embodiment 1 is to be described. The position of a motion estimation region is corrected in this variation, which differs from Embodiment 1 above. The following describes this variation, focusing on a different point from Embodiment 1 above with reference to FIG. 21. FIG. 21 illustrates an example of the motion estimation region in Variation 5 of Embodiment 1.

Region determiners 1262 and 2182 according to this variation correct the position of the motion estimation region determined based on the average motion vector, for example. Specifically, first, region determiners 1262 and 2182 temporarily determine a motion estimation region, based on the average motion vector of a plurality of motion vectors that a plurality of candidates have. For example, region determiners 1262 and 2182 temporarily determine motion estimation region 1050, as illustrated in FIG. 21.

Here, region determiners 1262 and 2182 determine whether the position corresponding to a zero motion vector is included in the motion estimation region temporarily determined. Specifically, region determiners 1262 and 2182 determine whether a reference position (for example, upper left corner) of the current block in a reference picture is included in motion estimation region 1050 determined temporarily. For example, in FIG. 21, region determiners 1262 and 2182 determine whether motion estimation region 1050 temporarily determined includes position 1051 corresponding to a zero motion vector.

Here, when the position corresponding to the zero motion vector is not included in the temporarily determined motion estimation region, region determiners 1262 and 2182 correct the position of the temporarily determined motion estimation region so that the motion estimation region includes the position corresponding to the zero motion vector. For example, in FIG. 21, motion estimation region 1050 temporarily determined does not include position 1051 corresponding to the zero motion vector, and thus region determiners 1262 and 2182 correct motion estimation region 1050 to motion estimation region 1052. As a result, position 1051 corresponding to the zero motion vector is included in corrected motion estimation region 1052.

On the other hand, when the position corresponding to the zero motion vector is included in the temporarily determined motion estimation region, region determiners 1262 and 2182 determine the temporarily determined motion estimation region as the motion estimation region as it is. Specifically, region determiners 1262 and 2182 do not correct the position of the motion estimation region.

As described above, region determiners 1262 and 2182 according to this variation can determine a region suitable for the search of a motion vector for a current block as the motion estimation region, thus improving the accuracy of the motion vector.

Variation 6 of Embodiment 1

Next, Variation 6 of Embodiment 1 is to be described. In Variation 5 above, the position of the motion estimation region is corrected so that the position corresponding to the zero motion vector is included, whereas in this variation, the position of the motion estimation region is corrected so that the position corresponding to the motion vector of one neighboring block among a plurality of neighboring blocks is included.

Figure 22:
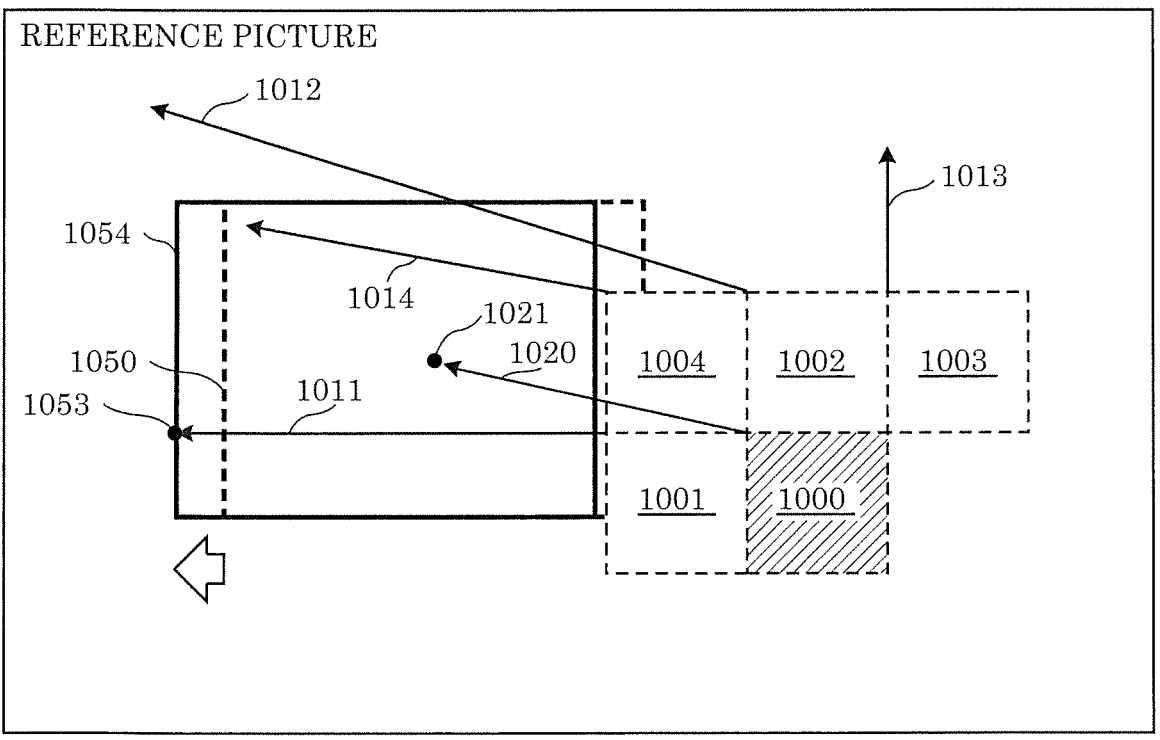
FIG. 22 illustrates an example of a motion estimation region in Variation 6 of Embodiment 1.

The following describes this variation with reference to FIG. 22. FIG. 22 illustrates an example of a motion estimation region in Variation 6 of Embodiment 1.

First, region determiners 1262 and 2182 temporarily determine a motion estimation region, based on, for example, an average motion vector, similarly to Variation 5. For example, region determiners 1262 and 2182 temporarily determine motion estimation region 1050, as illustrated in FIG. 22.

Here, region determiners 1262 and 2182 determine whether the position corresponding to the motion vector of one neighboring block among a plurality of neighboring blocks is included in the temporarily determined motion estimation region. For example, in FIG. 22, region determiners 1262 and 2182 determine whether motion estimation region 1050 temporarily determined includes position 1053 corresponding to motion vector 1011 of neighboring block 1001. A predetermined neighboring block may be used as the one neighboring block among the neighboring blocks, and a left neighboring block or an upper neighboring block may be used, for example.

Here, when the position corresponding to the motion vector of one neighboring block among the neighboring blocks is not included in the temporarily determined motion estimation region, region determiners 1262 and 2182 correct the position of the temporarily determined motion estimation region so that the motion estimation region includes the position corresponding to the motion vector of the one neighboring block. For example, in FIG. 22, motion estimation region 1050 temporarily determined does not include position 1053 corresponding to motion vector 1011 of neighboring block 1001, and thus region determiners 1262 and 2182 correct motion estimation region 1050 to motion estimation region 1054. As a result, position 1053 is included in corrected motion estimation region 1054.

On the other hand, when the position corresponding to the motion vector of one neighboring block among the neighboring blocks is included in the temporarily determined motion estimation region, region determiners 1262 and 2182 determine the temporarily determined motion estimation region as a motion estimation region as it is. Specifically, region determiners 1262 and 2182 do not correct the position of the motion estimation region.

As described above, region determiners 1262 and 2182 according to this variation can determine a region suitable for the search of a motion vector for a current block as a motion estimation region, and thus the accuracy of the motion vector can be improved.

Variation 7 of Embodiment 1

Next, Variation 7 of Embodiment 1 is to be described. In this variation, information on a motion estimation region is not included in a bitstream, which differs from Embodiment 1 above. The following describes this variation with reference to FIG. 23, focusing on a point different from Embodiment 1 above.

Figure 23:
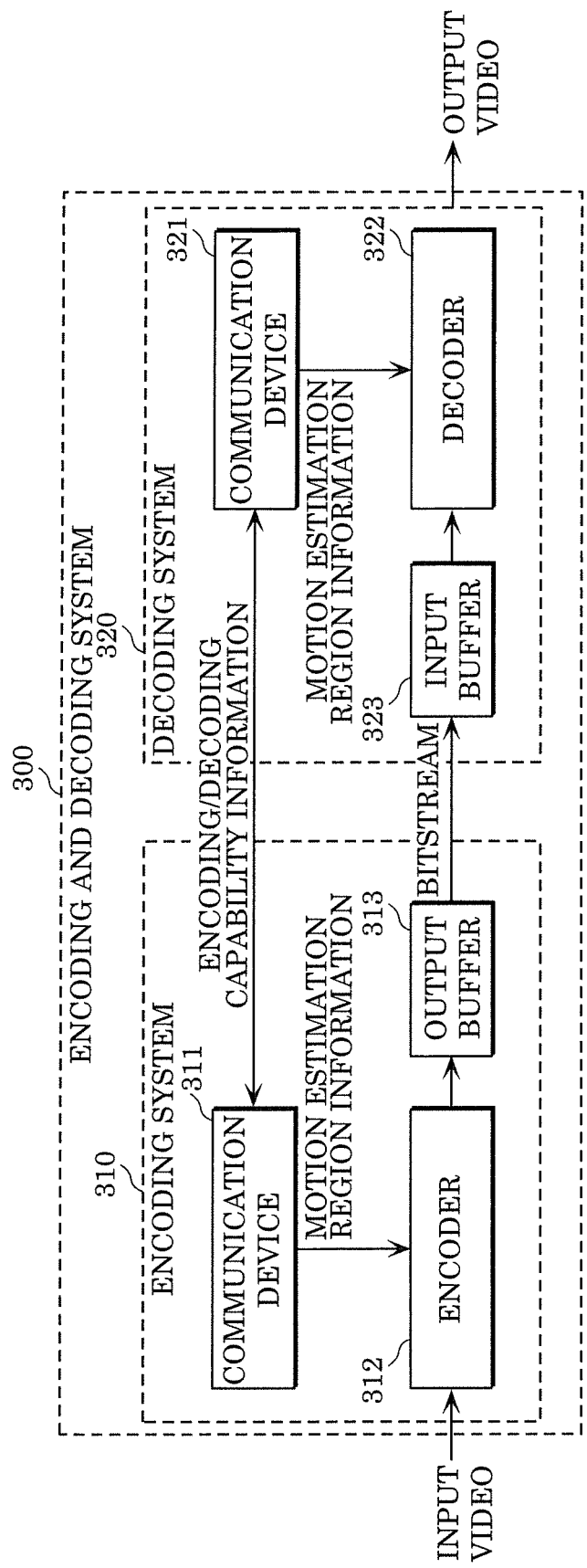
FIG. 23 is a block diagram illustrating a functional configuration of an encoding and decoding system according to Variation 7 of Embodiment 1.

FIG. 23 is a block diagram illustrating the functional configuration of encoding and decoding system 300 according to Variation 7 of Embodiment 1. As illustrated in FIG. 23, encoding and decoding system 300 includes encoding system 310 and decoding system 320.

Encoding system 310 encodes an input video, and outputs a bitstream. Encoding system 310 includes communication device 311, encoder 312, and output buffer 313.

Communication device 311 exchanges capability information with decoding system 320 via, for instance, a communication network (not illustrated), and generates motion estimation region information based on the capability information. Specifically, communication device 311 transmits encoding capability information to decoding system 320, and receives decoding capability information from decoding system 320. Encoding capability information includes information on throughput and a memory bandwidth for motion estimation in encoding system 310, for instance. Decoding capability information includes information on throughput and a memory bandwidth for motion estimation in decoding system 320, for instance.

Encoder 312 encodes an input video, and outputs a bitstream to output buffer 313. At this time, encoder 312 performs substantially the same processing as that performed by encoder 100 according to Embodiment 1, except that the size of a motion estimation region is determined based on motion estimation region information obtained from communication device 311.

Output buffer 313 is a so-called buffer memory, temporarily stores a bitstream input from encoder 312, and outputs the stored bitstream to decoding system 320 via the communication network, for instance.

Decoding system 320 decodes the bitstream input from encoding system 310, and outputs an output video to a display (not illustrated), for instance. Decoding system 320 includes communication device 321, decoder 322, and input buffer 323.

Similarly to communication device 311 of encoding system 310, communication device 321 exchanges capability information with encoding system 310 via a communication network, for instance, and generates motion estimation region information based on the capability information. Specifically, communication device 311 transmits decoding capability information to encoding system 310, and receives encoding capability information from encoding system 310.

Decoder 322 decodes the bitstream input from input buffer 323, and outputs an output video to a display, for instance. At this time, decoder 322 performs substantially the same processing as that performed by decoder 200 according to Embodiment 1, except that the motion estimation region is determined based on the motion estimation region information obtained from communication device 321. Note that if the motion estimation region determined based on the motion estimation region information obtained from communication device 321 exceeds a motion estimation region processable by decoder 322, a message indicating that decoding is impossible may be transmitted to communication device 321.

Input buffer 323 is a so-called buffer memory, temporarily stores a bitstream input from encoding system 310, and outputs the stored bitstream to decoder 322.

As described above, according to encoding decoding system 300 according to this variation, even if information on a motion estimation region is not included in a bitstream, encoder 312 and decoder 322 can perform motion estimation using the same motion estimation region. Accordingly, the encoding amount for a motion estimation region can be reduced. In addition, it is not necessary for region determiner 1262 to perform processing for determining the horizontal pixel count and the vertical pixel count that indicate the size of the motion estimation region, and thus the amount of processing can be reduced.

Variation 8 of Embodiment 1

Note that in Embodiment 1 above, all reference pictures included in the reference picture list are sequentially selected, yet not necessarily all the reference pictures need to be selected. This variation describes an example of limiting the number of selected reference pictures.

As with the case of determining the size of the motion estimation region, region determiner 1262 of encoder 100 according to this variation determines the number of reference pictures permitted to be used in motion estimation in the FRUC mode (hereinafter, referred to as a permitted reference picture count), based on a memory bandwidth and the throughput, for instance. Information on the determined permitted reference picture count (hereinafter, referred to as permitted reference picture count information) is written into a bitstream.

Region determiner 2182 of decoder 200 according to this variation determines a permitted reference picture count based on the permitted reference picture count information parsed from the bitstream.

Note that the position in the bitstream where permitted reference picture count information is written is not limited in particular. For example, similarly to the motion estimation region information illustrated in FIG. 12, permitted reference picture count information may be written in a VPS, an SPS, a PPS, a slice header, or a video system setting parameter.

The number of reference pictures used in the FRUC mode is limited based on the permitted reference picture count determined in this manner. Specifically, region determiners 1262 and 2182 determine whether there is an unselected reference picture and furthermore, the number of selected reference pictures is less than the permitted reference picture count, in step S111 in FIG. 13, for example. Here, when there is no unselected reference picture or the number of selected reference pictures is greater than or equal to the permitted reference picture count (Yes in S111), the processing proceeds to step S112. Accordingly, this prohibits selection of a reference picture from the reference picture list which results in the excess of the permitted reference picture count.

In this case, in step S111 in FIG. 13, region determiners 1262 and 2182 may select a reference picture in the ascending order of reference picture index values or in the order of reference pictures temporally closer to the current picture, for example. In this case, a reference picture having a small reference picture index value or a reference picture temporally close to the current picture is preferentially selected from the reference picture list. Note that the temporal distance between the current picture and a reference picture may be determined based on the picture order count (POC).

As described above, region determiners 1262 and 2182 according to this variation can limit the number of reference pictures used in motion estimation to the number less than or equal to the permitted reference picture count. Accordingly, the processing load for motion estimation can be reduced.

Note that, for example, when time scalable encoding/decoding are performed, region determiners 1262 and 2182 may limit the number of reference pictures included in a lower hierarchy than the hierarchy of the current picture indicated by a time identifier, based on the permitted reference picture count.

Variation 9 of Embodiment 1

Next, Variation 9 of Embodiment 1 is to be described. This variation describes a method of determining the size of the motion estimation region when a plurality of reference pictures are referred to in inter prediction.

When a plurality of reference pictures are referred to in inter prediction, the size of the motion estimation region may depend on the number of reference pictures that are referred to in inter prediction, in addition to the memory bandwidth and the throughput. Specifically, region determiners 1262 and 2182 first determine the total size of a plurality of motion estimation regions in the plurality of reference pictures referred to in inter prediction, based on the memory bandwidth and the throughput. Then, region determiners 1262 and 2182 determine the size of a motion estimation region in each reference picture, based on the number of reference pictures and the determined total size. Specifically, region determiner 1262 determines the sizes of the motion estimation regions in the reference pictures so that the total of the sizes of the motion estimation regions in the reference pictures matches the total size of motion estimation regions determined based on the memory bandwidth and the throughput.

Figure 24:
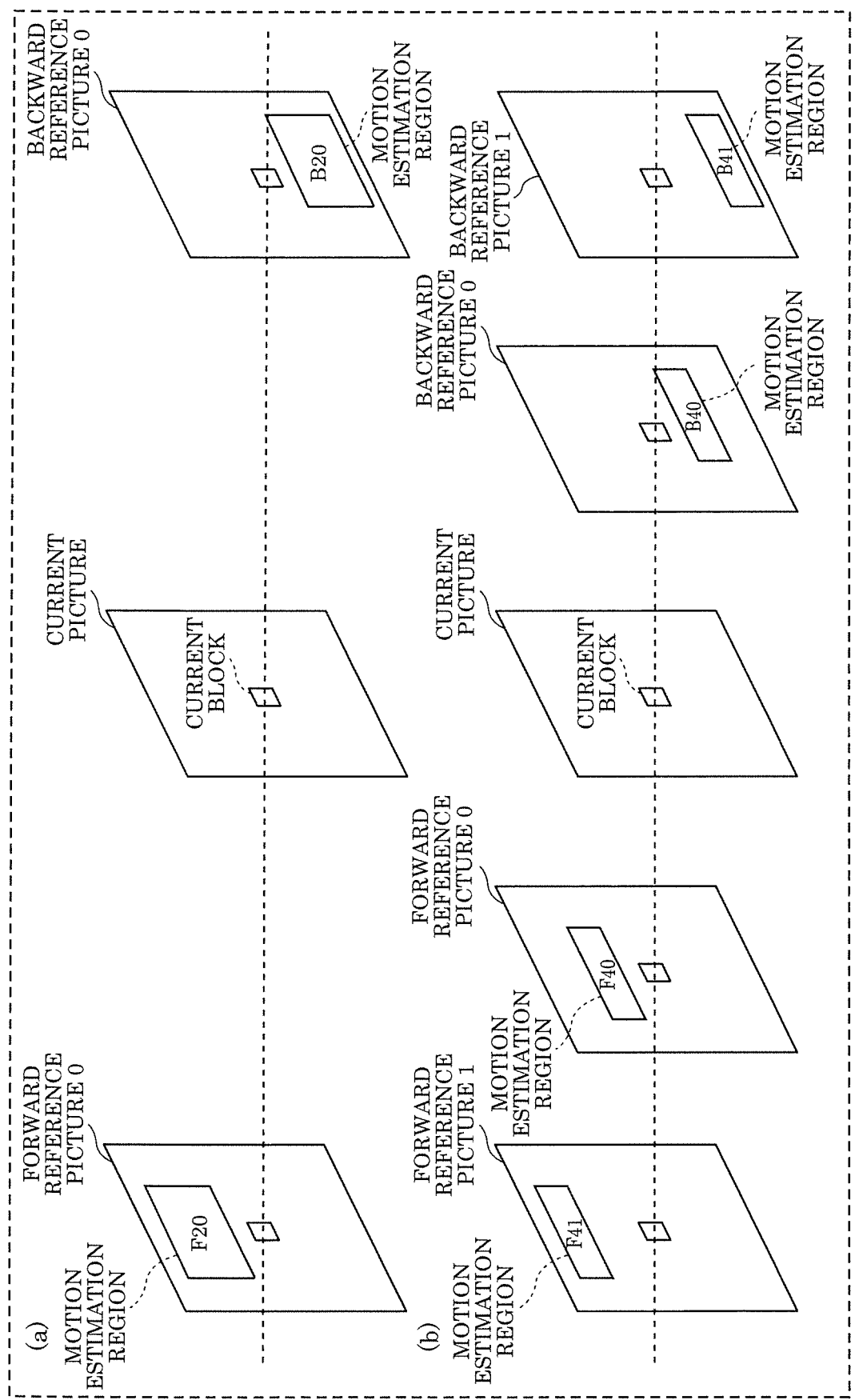
FIG. 24 illustrates motion estimation regions in Variation 9 of Embodiment 1.

The motion estimation regions in reference pictures determined in this manner is to be specifically described with reference to FIG. 24. FIG. 24 illustrates a motion estimation region in Variation 9 of Embodiment 1. In FIG. 24, (a) illustrates examples of motion estimation regions in prediction in which two reference pictures are referred to (bi-prediction), and (b) illustrates examples of motion estimation regions in the prediction in which four reference pictures are referred to.

In (a) of FIG. 24, motion estimation regions F20 and B20 are determined for forward reference picture 0 and backward reference picture 0, respectively. Pattern matching (template matching or bilateral matching) is performed in motion estimation region F20 and motion estimation region B20.

In (b) of FIG. 24, motion estimation regions F40, F41, B40, and B41 are determined for forward reference picture 0, forward reference picture 1, backward reference picture 0, and backward reference picture 1, respectively. Accordingly, pattern matching is performed within motion estimation regions F40, F41, B40, and B41.

Here, the total of the sizes of motion estimation regions F20 and B20 substantially matches the total of the sizes of motion estimation regions F40, F41, B40, and B41. Specifically, the sizes of motion estimation regions in reference pictures are determined based on the number of reference pictures referred to in inter prediction.

As described above, region determiners 1262 and 2182 according to this variation can determine the sizes of motion estimation regions in reference pictures based on the number of reference pictures referred to in inter prediction. Accordingly, the total size of regions in which motion estimation is performed can be controlled, and thus processing load and the required amount of the memory bandwidth can be more efficiently reduced.

Variation 10 of Embodiment 1

Next, Variation 10 of Embodiment 1 will be described. In this variation, the case of performing motion compensation prediction by bi-directional optical flow (BIO) and/or overlapped block motion compensation (OBMC), as required, following motion estimation and motion compensation in the FRUC mode (hereinafter referred to as FRUC processing) according to Embodiment 1 and the respective variations thereof will be described in detail with reference to FIG. 25 and FIG. 26. The FRUC mode is a mode that allows a motion vector to be determined without having to write information regarding the motion vector in a stream, by performing cost evaluation using a decoded picture or decoded block on the decoder side. Specifically, in the FRUC mode, the motion vector of a current block to be coded/decoded is estimated without using the image of the current block to be coded/decoded. BIO processing and OBMC processing are each an example of a correction process of correcting the motion vector or the motion compensation image obtained in the FRUC mode.

Figure 25:
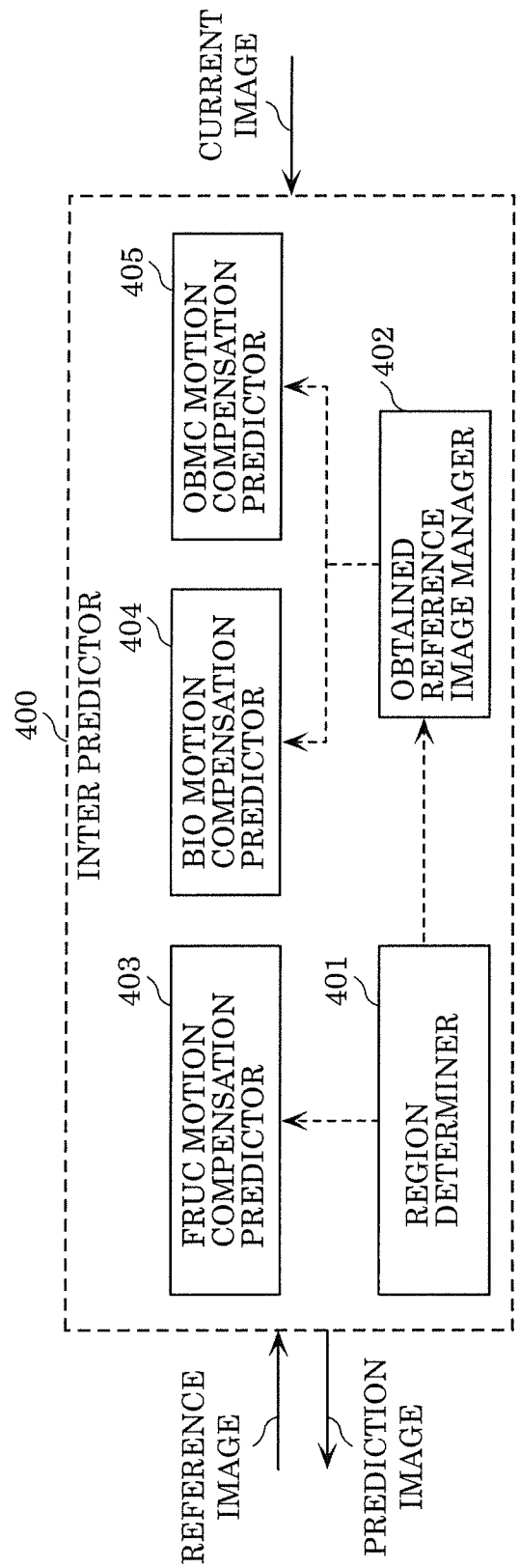
FIG. 25 is a block diagram illustrating an internal configuration of an inter predictor of an encoder and a decoder according to Variation 10 of Embodiment 1.

FIG. 25 is a block diagram illustrating an internal configuration of inter predictor 400 of an encoder/decoder according to Variation 10 of Embodiment 1. Inter predictor 400 according to this variation performs the motion compensation prediction of each of FRUC, BIO, and OBMC. As illustrated in FIG. 25, inter predictor 400 includes region determiner 401, obtained reference image manager 402, FRUC motion compensation predictor 403, BIO motion compensation predictor 404, and OBMC motion compensation predictor 405.

Region determiner 401 determines a motion estimation region in the same manner as in Embodiment 1 or any of the variations thereof. In addition, region determiner 401 may determine, as the motion compensation region, a region inside a reference picture to be used in motion compensation.

Obtained reference image manager 402 holds, as information regarding a region of a reference image, information regarding the motion estimation region and/or the motion compensation region determined by region determiner 401.

FRUC motion compensation predictor 403 obtains a reference image from a frame memory outside the encoder/decoder, and performs motion estimation using the reference image and an input image (current image). Furthermore, FRUC motion compensation predictor 403 obtains a reference image from a frame memory outside the encoder/decoder, and performs motion compensation using the reference image. At this time, the motion estimation region and the motion compensation region in the FRUC mode are limited according to the memory bandwidth between the encoder/decoder and the frame memory and the motion estimation or motion compensation throughput of FRUC motion compensation predictor 403. Here, the motion estimation region and the motion compensation region in the FRUC mode (i.e., the first region) are limited to within the motion estimation region and the motion compensation region determined by region determiner 401.

BIO motion compensation predictor 404 determines whether BIO processing is to be performed, based on the information regarding the region of the reference image obtained from obtained reference image manager 402. In the same manner, OBMC motion compensation predictor 405 determines whether OBMC processing is to be performed, based on the information regarding the region of the reference image obtained from obtained reference image manager 402.

Note that when there is no limitation on the motion estimation region and/or motion compensation region in the FRUC mode, inter predictor 400 need not include region determiner 401. At this time, obtained reference image manager 402 may hold information regarding the regions of all the reference images obtained by FRUC motion compensation predictor 403. In addition, BIO motion compensation predictor 404 and OBMC motion compensation predictor 405 may determine whether BIO processing and OBMC processing is to be performed, based on the information regarding the regions of all the reference images.

Figure 26:
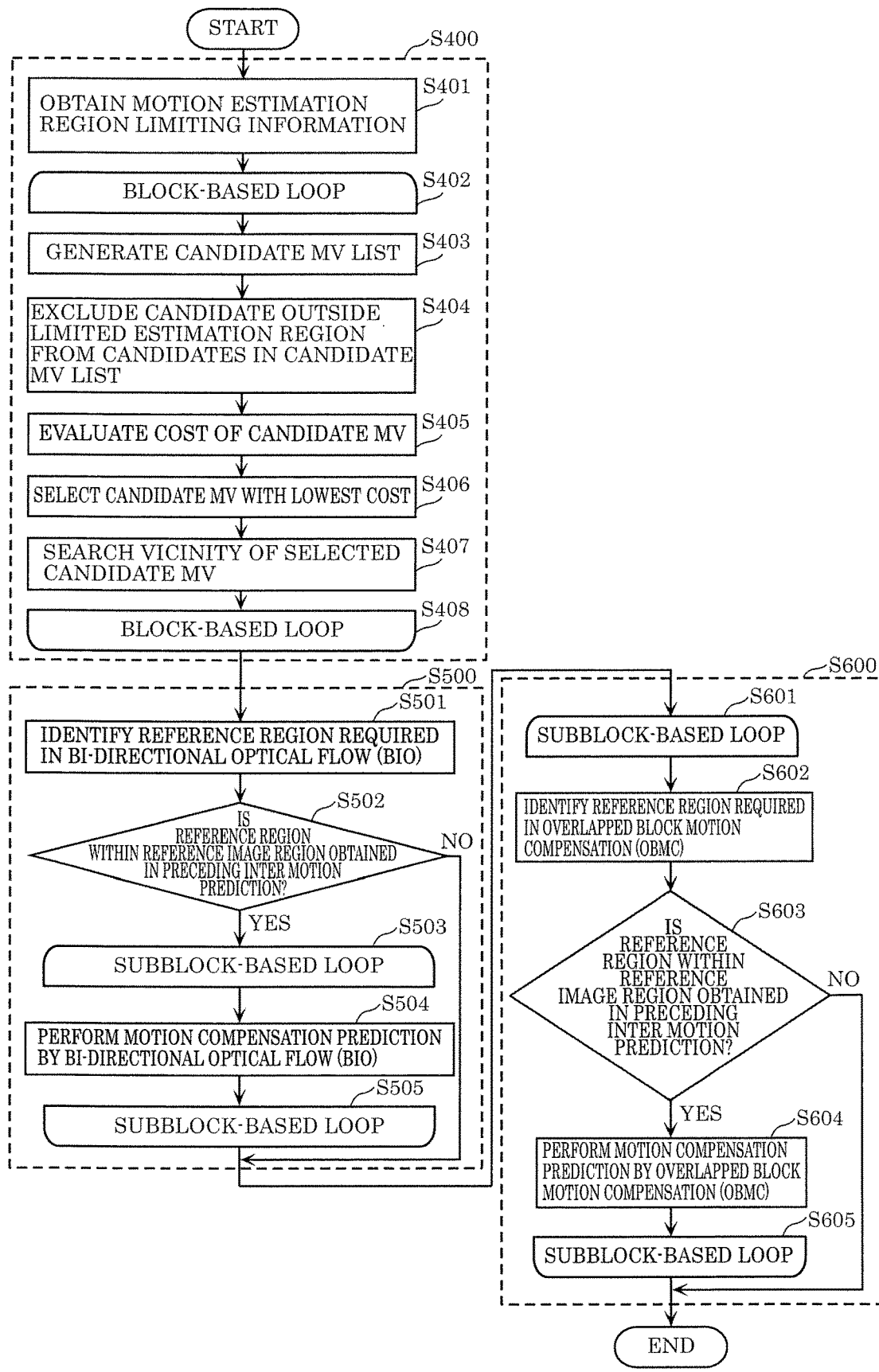
FIG. 26 is a flow chart illustrating processing performed by the inter predictor of the encoder and the decoder according to Variation 10 of Embodiment 1.

Next, processing performed by inter predictor 400 according to this variation will be described with reference to FIG. 26. FIG. 26 is a flowchart illustrating processing performed by inter predictor 400 of the encoder and the decoder according to Variation 10 of Embodiment 1.

In FIG. 26, processing is performed in the order of FRUC processing (S400), BIO processing (S500), and OBMC processing (S600). FRUC processing is the same as in Embodiment 1 or any of the variations thereof. In FRUC processing, first, region determiner 401 obtains information limiting the motion estimation region (S401). Specifically, region determiner 401 determines, as the motion estimation region, a partial region inside a reference picture for which motion estimation is allowed.

Next, FRUC motion compensation predictor 403 performs a block-based loop process (S402 to S408). In the block-based loop process, first, FRUC motion compensation predictor 403 generates a candidate MV list (S403). Then, FRUC motion compensation predictor 403 excludes a candidate having a motion vector corresponding to a position outside the limited motion estimation region, from candidates in the candidate MV list (S404). FRUC motion compensation predictor 403 performs cost evaluation of the remaining candidates (S405), and selects the candidate with the lowest cost (S406). Lastly, FRUC motion compensation predictor 403 searches the vicinity of a position within the reference picture, which corresponds to the motion vector of the selected candidate (S407).

After the FRUC processing (S400), BIO processing (S500) is performed. In the BIO processing, first, BIO motion compensation predictor 404 identifies a reference region required in BIO (S501). Specifically, BIO motion compensation predictor 404 identifies, as the reference region, a region inside a reference picture to be referred to in BIO. The reference region identified here is an example of a second region.

BIO motion compensation predictor 404 determines whether the identified reference region (i.e., the second region) is entirely included in the reference image (i.e., the first region) obtained in the FRUC processing (S502). For example, BIO motion compensation predictor 404 determines whether the entirety of the identified reference region is included within the motion estimation region determined in step S401.

Here, when the identified reference region is entirely included in the reference image obtained in the FRUC processing (Yes in S502), a subblock-based loop process is performed (S503 to S505). In the subblock-based loop process, motion compensation prediction by BIO is performed (S504). On the other hand, when the identified reference region is not entirely included in the reference image obtained in the FRUC processing (No in S502), the subblock-based loop process is skipped.

After the BIO processing (S500), OBMC processing (S600) is performed. In the OBMC processing, a subblock-based loop process (S601 to S605) is performed. In the subblock-based loop process, OBMC motion compensation predictor 405 first identifies a reference region required in OBMC (S602). Specifically, OBMC motion compensation predictor 405 identifies, as the reference region, a region inside a reference picture to be referred to in OBMC. The reference region identified here is an example of a second region.

OBMC motion compensation predictor 405 determines whether the identified reference region (i.e., the second region) is entirely included in the reference image (i.e., the first region) obtained in the FRUC processing (S603). For example, OBMC motion compensation predictor 405 determines whether the entirety of the identified reference region is included within the motion estimation region determined in step S401.

Here, when the identified reference region is entirely included in the reference image obtained in the FRUC processing (Yes in S603), motion compensation prediction by OBMC is performed (S604). On the other hand, when the identified reference region is not entirely included in the reference image obtained in the FRUC processing (No in S603), the subblock-based loop process is broken and the OBMC processing ends.

In this manner, in the example in the figure, following FRUC processing, BIO processing and OBMC processing are performed. At this time, when at least part of the pixel region referred to in the BIO processing or the OBMC processing is outside the region of the reference image obtained in the FRUC processing, the BIO processing or the OBMC processing that refers to the at least part of the pixel region is excluded from a candidate for which BIO processing or OBMC processing is to be performed.

Furthermore, when, upon identifying a reference region required in each of the BIO processing of the current block and the OBMC processing of the current subblock, it is determined that at least part of the identified reference region is outside the region of the reference image obtained in the FRUC processing, the BIO processing of the current block and/or the OBMC processing of the current subblock may be prohibited.

Note that it is acceptable for only one of the BIO processing and the OBMC processing to be prohibited based on the reference region.

As described above, according to this variation, in inter motion compensation prediction (for example, BIO, OBMC, etc.) following FRUC processing, the inter motion compensation prediction can be prohibited when a region exceeding the reference image region obtained in the FRUC processing is to be referred to. Specifically, BIO processing or OBMC processing is permitted if the second region to be referred to in the BIO processing or the OBMC processing is entirely included in the first region to be referred to in the FRUC processing, otherwise, the BIO processing or the OBMC processing is prohibited. According to this, the increase of external memory access associated with BIO processing and OBMC processing can be inhibited.

Note that a coded stream that is limited so that a region exceeding the reference image region obtained in the FRUC processing is not referred to may be decoded.

Note that in this variation the motion estimation region is limited in the FRUC processing, yet the present disclosure is not limited to this. For example, in FRUC processing, the motion estimation region need not be limited. In this case, since there is no need to obtain a new reference image in the inter motion compensation prediction (for example, BIO, OBMC, etc.) following FRUC processing, external memory access associated with the inter motion compensation prediction following FRUC processing can be inhibited.

Other Variations of Embodiment 1

The above has given a description of an encoder and a decoder according to one or more aspects of the present disclosure, based on the embodiment and the variations, yet the present disclosure is not limited to the embodiment and the variations. The one or more aspects of the present disclosure may also encompass various modifications that may be conceived by those skilled in the art to the embodiment and the variations, and embodiments achieved by combining elements in different embodiments, without departing from the scope of the present disclosure.

For example, in the embodiment and the variations described above, motion estimation in the FRUC mode is performed per block unit having a variable size called a coding unit (CU), a prediction unit (PU), or a transform unit (TU), but the present disclosure is not limited to this. Motion estimation in the FRUC mode may be performed per subblock obtained by further splitting a block having a variable size. In this case, a vector (for example, a mean vector or a median vector) for determining the position of the motion estimation region may be obtained per picture, block, or subblock.

For example, in the embodiment and the variations described above, the size of the motion estimation region is determined based on the throughput and the memory bandwidth, for instance, yet the present disclosure is not limited to this. For example, the size of the motion estimation region may be determined based on the type of a reference picture. For example, when a reference picture is a B picture, region determiner 1262 determines the size of the motion estimation region to be a first size, and when the reference picture is a P picture, determines the size of a motion estimation region to be a second size larger than the first size.

For example, in the embodiment and the variations described above, when the position corresponding to the motion vector that a candidate has is not included in the motion estimation region, the candidate is excluded from the candidate list, but the present disclosure is not limited to this. For example, when a portion or the entirety of an adjacent region corresponding to a motion vector that a candidate has is not included in a motion estimation region, the candidate may be excluded from the candidate list.

For example, in the embodiment and the variations described above, pattern matching is performed within an adjacent region corresponding to a motion vector that the selected candidate has, yet the present disclosure is not limited to this. For example, pattern matching may not be performed in an adjacent region. In this case, the motion vector that the candidate has may be determined as a motion vector for the current block as it is.

For example, in the embodiment and the variations described above, a candidate excluded from the candidate list has a motion vector corresponding to the position outside the motion estimation region, yet the present disclosure is not limited to this. For example, if a pixel used for interpolation is not included in a motion estimation region when motion compensation is performed with decimal pixel accuracy using a motion vector that a candidate has, the candidate may be excluded from the candidate list. Specifically, whether a candidate is excluded may be determined based on the position of a pixel used to interpolate a decimal pixel. For example, when BIO or OBMC is applied, a candidate for which a pixel outside the motion estimation region is used in the BIO or OBMC may be excluded from the candidate list. For example, a candidate having the smallest reference picture index out of a plurality of candidates may be retained, and the other candidates may be excluded.

For example, the embodiment and the variations above have described the case where a mode for limiting a motion estimation region in a reference picture is applied at all times, yet the present disclosure is not limited thereto. For example, whether the mode is applied or not may be selected per video, sequence, picture, slice, or block. In this case, flag information indicating whether the mode is applied may be included in a bitstream. The position of the flag information in the bitstream does not need to be limited in particular. For example, flag information may be included in the same position as that of the motion estimation region information illustrated in FIG. 12.

For example, the embodiment and the variations above have not described in detail scaling of a motion vector, yet the motion vector of each candidate may be scaled, based on a reference picture serving as a basis, for example. Specifically, the motion vector of each candidate may be scaled based on a reference picture having a reference picture index different from the reference picture index indicated by the result of encoding/decoding. As the reference picture serving as a basis, for example, a reference picture having a reference picture index "0" may be used. For example, as a reference picture serving as a basis, a reference picture closest to the current picture in the output order may be used.

Note that a motion estimation region may be limited similarly to the embodiment and the variations above also when a region in a position above the current block or shifted to the left of the current block in a current picture may be referred to, and the same block as the current block is searched for (for example, in the case of intra block copy), which differs from the case of inter frame prediction as in the embodiment and the variations described above.

Note that in the embodiment and the variations described above, information that defines association between the feature quantity or the type of a current block or a current picture and the sizes of motion estimation regions may be predetermined, and with reference to the information, the size of the motion estimation region corresponding to the feature quantity or the type of a current block or a current picture may be determined. As the feature quantity, the size (pixel count) may be used, for example, and as the type, a prediction mode (for example, single prediction or bi-prediction) may be used, for example.

Note that, in the foregoing embodiment and each of the variations thereof, the motion estimation region that is limited in the FRUC processing may be determined by adding adjacent pixels to be referred to in the inter motion compensation prediction (for example, BIO, OBMC, etc.) following the FRUC processing. For example, the motion estimation region in the FRUC processing may be determined to include the reference region to be referred to in the inter motion compensation prediction to be performed after the FRUC processing. Specifically, in the same manner as in the foregoing embodiment and any of the variations thereof, it is acceptable to determine a motion estimation region that is limited to include a motion estimation region determined based on a motion vector and a region that may be referred to in the inter motion compensation prediction following the FRUC processing.

Note that the motion estimation region may be determined to include the reference region to be referred to in LIC processing.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

FIG. 25 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

The switching of content will be described with reference to a scalable stream, illustrated in FIG. 26, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 26. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 27:
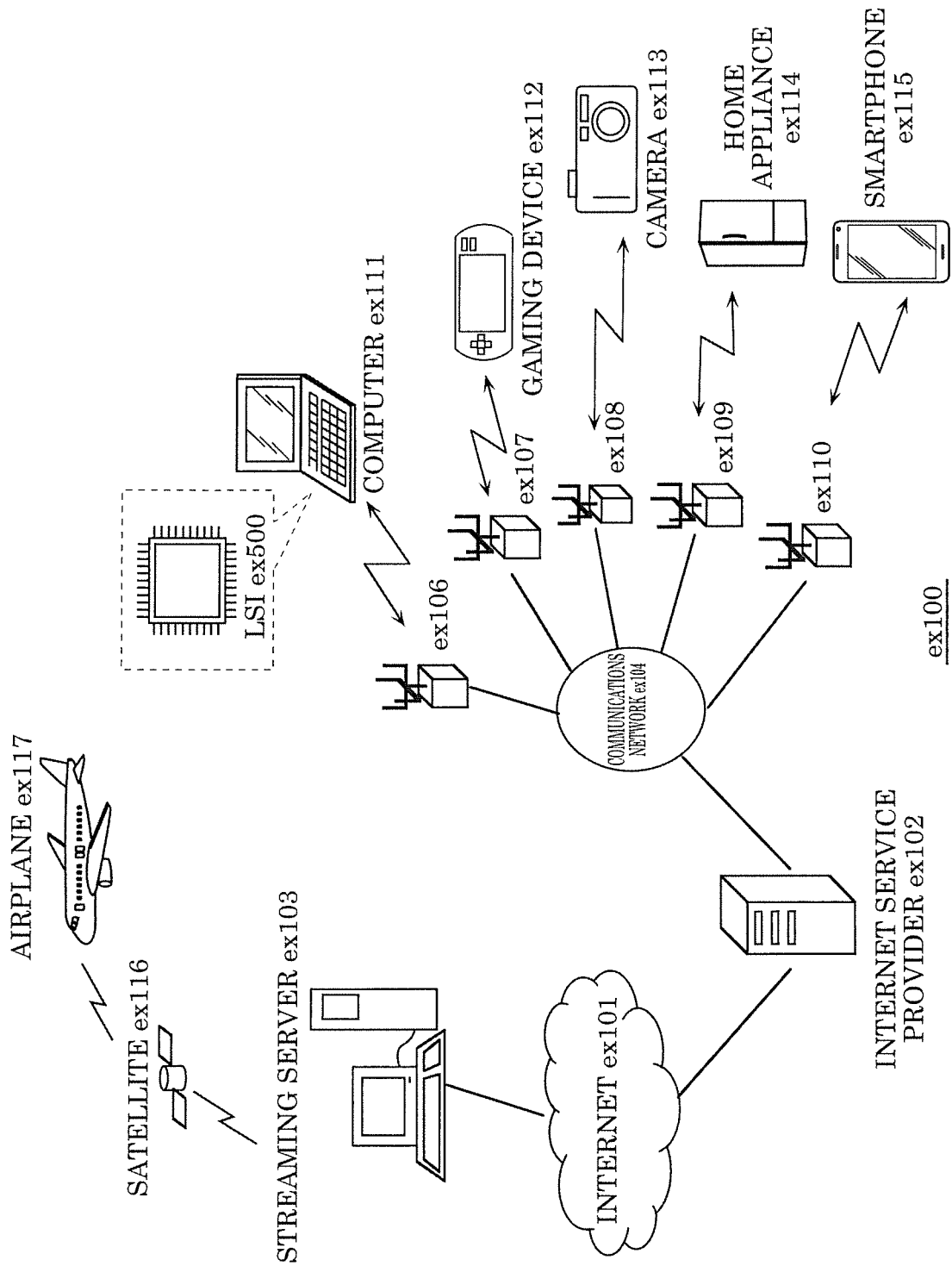
FIG. 27 illustrates an overall configuration of a content providing system for implementing a content distribution service.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 27, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 28:
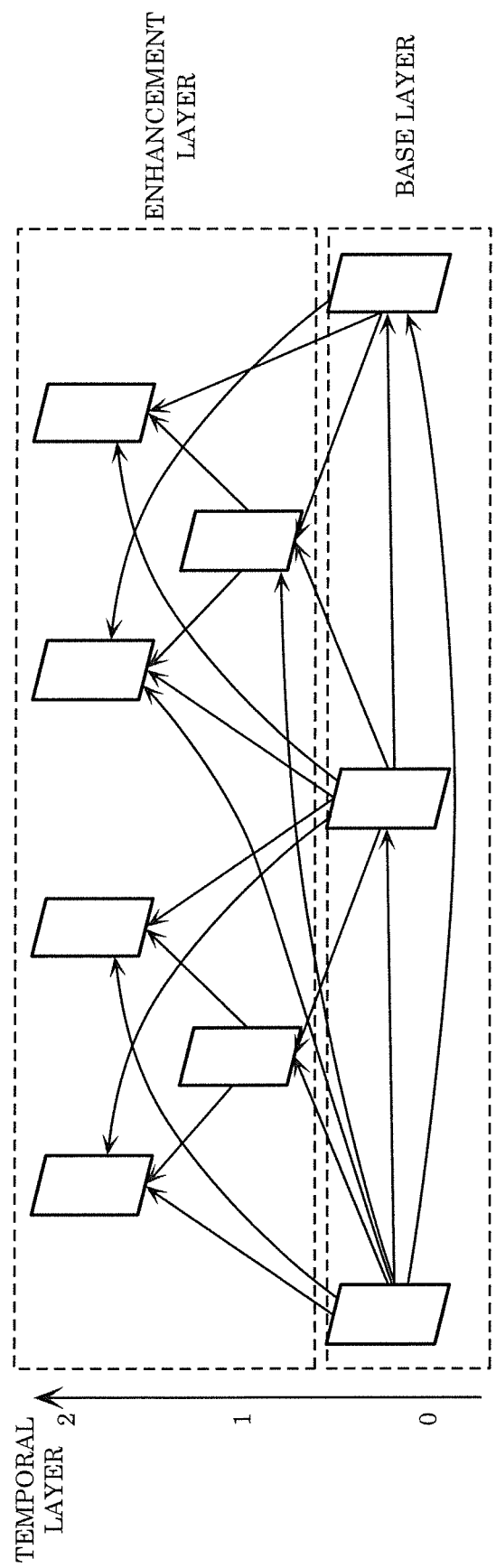
FIG. 28 illustrates one example of an encoding structure in scalable encoding.
Figure 29:
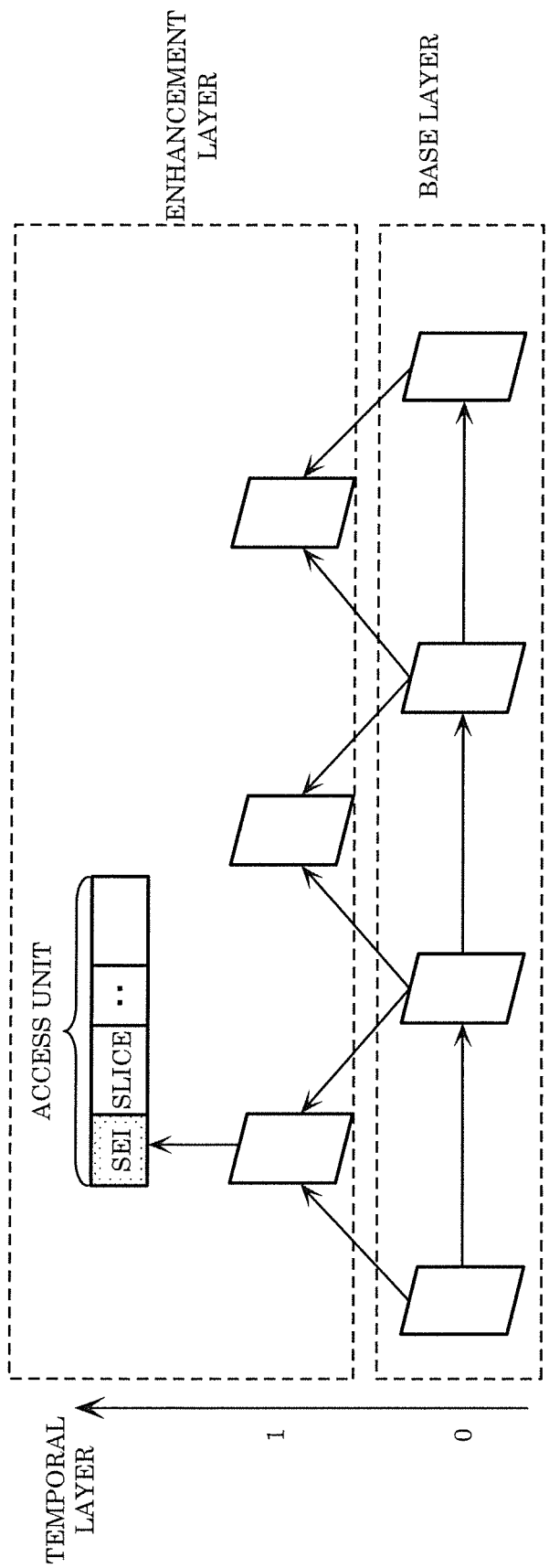
FIG. 29 illustrates one example of an encoding structure in scalable encoding.

FIG. 28 illustrates an example of a display screen of a web page on, for example, computer ex111. FIG. 29 illustrates an example of a display screen of a web page on, for example, smartphone ex115. As illustrated in FIG. 28 and FIG. 29, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 30:
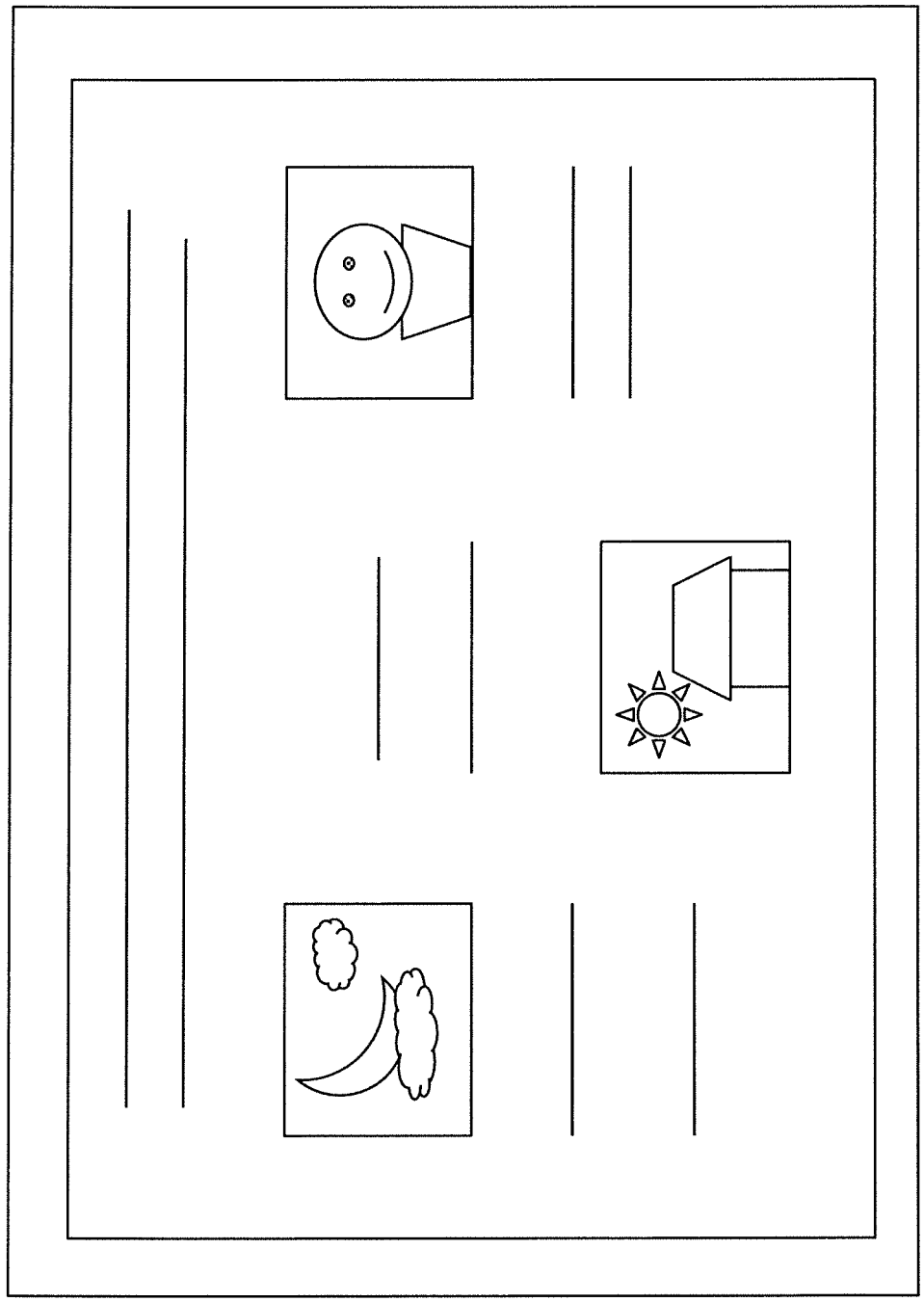
FIG. 30 illustrates an example of a display screen of a web page.
Figure 31:
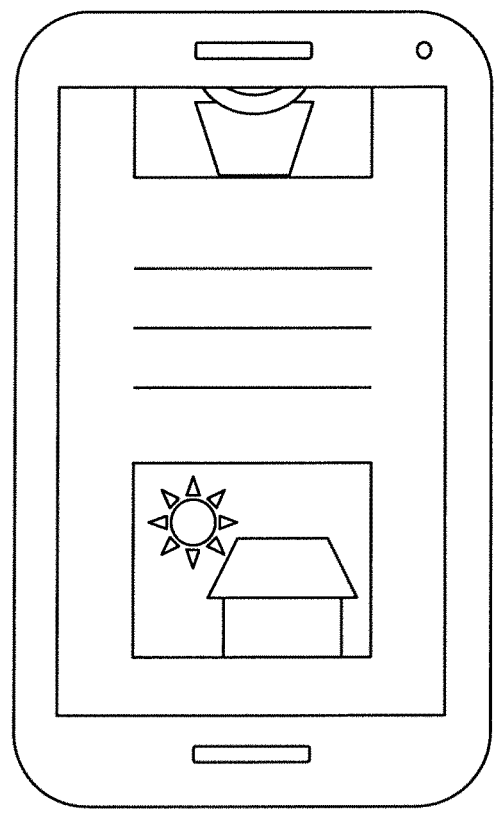
FIG. 31 illustrates an example of a display screen of a web page.
Figure 32:
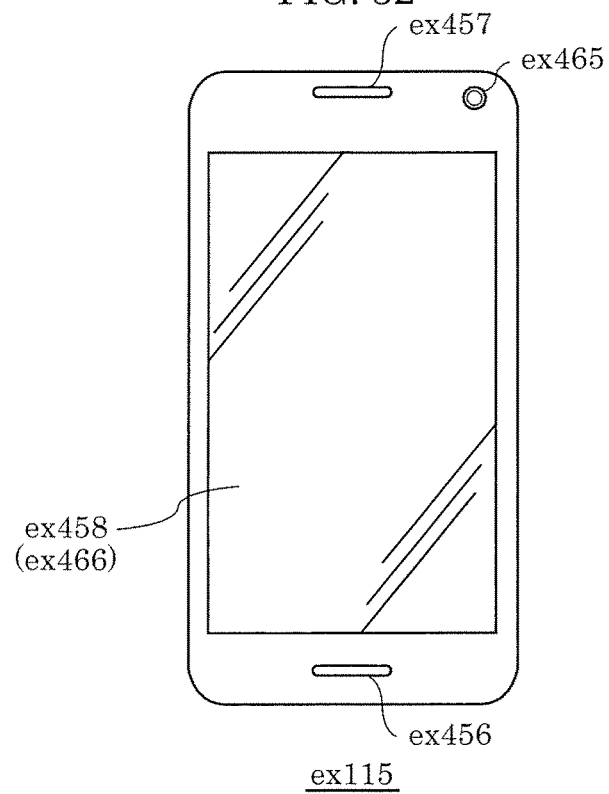
FIG. 32 illustrates one example of a smartphone.
Figure 33:
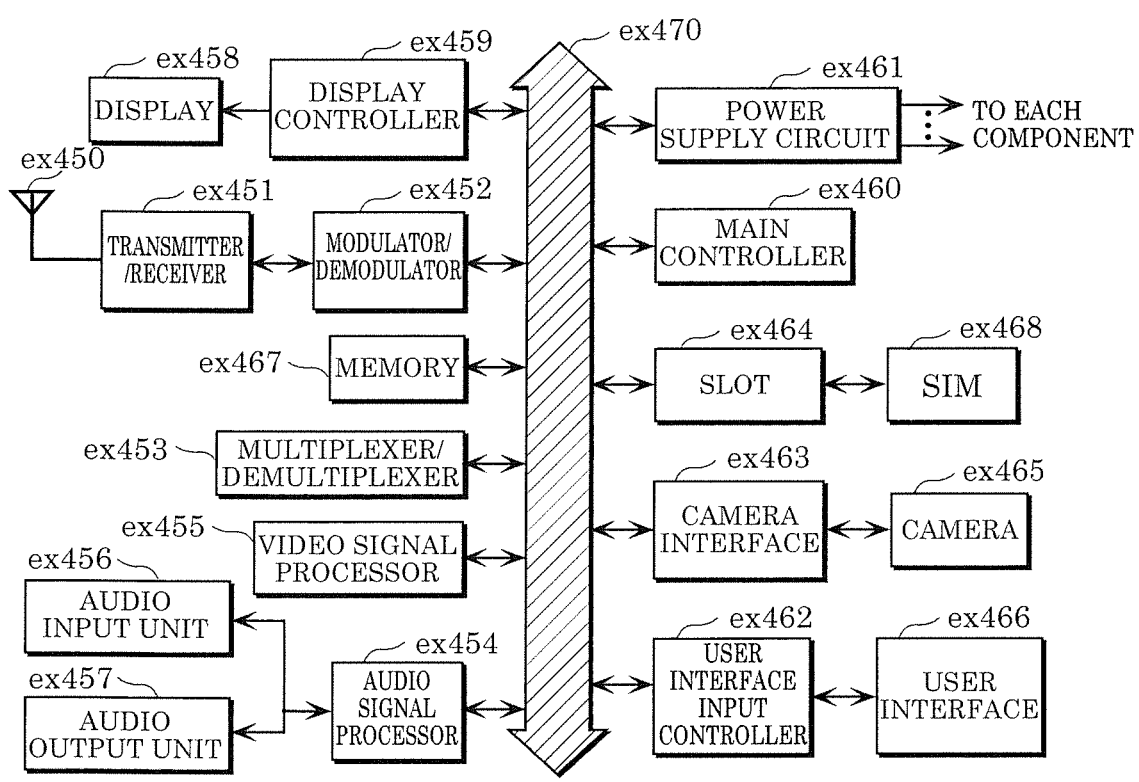
FIG. 33 is a block diagram illustrating a configuration example of a smartphone.

FIG. 30 illustrates smartphone ex115. FIG. 31 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a television receiver, a digital video recorder, a car navigation system, a mobile phone, a digital camera, or a digital video camera, for example.

What is claimed is:

1. An encoder that encodes a picture to generate a coded stream, the encoder comprising:
   circuitry; and
   a memory coupled to the circuitry,
   wherein the circuitry performs, using the memory:
   generating a prediction image of a current block included in a current picture by referring to a first region included in a reference picture different from the current picture;
   operating a bi-directional optical flow process to correct the prediction image by referring to a second region included in the first region, and not operating the bi-directional optical flow process by referring to a third region not included in the first region; and
   encoding the current block based on the prediction image.

2. The encoder according to claim 1,
   wherein in the generating a prediction image, the circuitry estimates at least one motion vector without using an image of the current block, and generates the prediction image by using the at least one motion vector.

3. The encoder according to claim 1, wherein the circuitry performs:
   after not operating the bi-directional optical flow process by referring to the third region, determining to perform an overlapped block motion compensation (OBMC) process.

4. A decoder that decodes a coded stream to generate a picture, the decoder comprising:
   circuitry; and
   a memory coupled to the circuitry,
   wherein the circuitry performs, using the memory:
   generating a prediction image of a current block included in a current picture by referring to a first region included in a reference picture different from the current picture;
   operating a bi-directional optical flow process to correct the prediction image by referring to a second region included in the first region, and not operating the bi-directional optical flow process by referring to a third region not included in the first region; and
   decoding the current block based on the prediction image.

5. The decoder according to claim 4,
   wherein in the generating a prediction image, the circuitry estimates at least one motion vector without using an image of the current block, and generates the prediction image by using the at least one motion vector.

6. The decoder according to claim 4, wherein the circuitry performs:
   after not operating the bi-directional optical flow process by referring to the third region, determining to perform an overlapped block motion compensation (OBMC) process.

* * * * *